United States Patent
Stanley

(10) Patent No.: US 7,403,400 B2
(45) Date of Patent: Jul. 22, 2008

(54) SERIES INTERLEAVED BOOST CONVERTER POWER FACTOR CORRECTING POWER SUPPLY

(75) Inventor: Gerald R. Stanley, Osceola, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 221 days.

(21) Appl. No.: 10/626,149

(22) Filed: Jul. 24, 2003

(65) Prior Publication Data

US 2005/0017699 A1 Jan. 27, 2005

(51) Int. Cl.
*H02M 3/335* (2006.01)

(52) U.S. Cl. .............................. 363/16; 363/17; 363/65; 323/225

(58) Field of Classification Search .................. 363/16, 363/17, 67, 68, 71, 80, 41; 323/222, 224, 323/225, 284, 285
See application file for complete search history.

(56) References Cited

U.S. PATENT DOCUMENTS

| | | | |
|---|---|---|---|
| 3,265,930 A | | 8/1966 | Powell |
| 4,172,277 A | * | 10/1979 | Pinson ........................ 363/80 |
| 4,190,882 A | | 2/1980 | Chevalier et al. |
| 4,750,102 A | | 6/1988 | Yamano et al. ............. 363/142 |
| 4,903,181 A | | 2/1990 | Seidel |
| 4,933,828 A | | 6/1990 | Ogawa et al. ................. 363/81 |
| 5,383,109 A | | 1/1995 | Maksimovic et al. |
| 5,657,219 A | | 8/1997 | Stanley |
| 5,870,294 A | * | 2/1999 | Cyr .............................. 363/41 |
| 5,923,152 A | | 7/1999 | Guerrera |
| 6,108,223 A | | 8/2000 | Julian et al. ................... 363/78 |
| 6,157,556 A | | 12/2000 | Wobben ...................... 363/132 |
| 6,175,218 B1 | | 1/2001 | Choi et al. ................... 323/222 |

(Continued)

FOREIGN PATENT DOCUMENTS

EP 0751610 A1 2/1997

(Continued)

OTHER PUBLICATIONS

Brett Andrew Miwa, "Interleaved Conversion Techniques for High Density Power Supplies", *Department of Electrical Engineering and Computer Science, Massachusetts Institute of Technology*, Chapters 1, 2 and 6, May 1992.

(Continued)

*Primary Examiner*—Jessica Han
(74) *Attorney, Agent, or Firm*—Brinks Hofer Gilson & Lione

(57) ABSTRACT

A power factor correcting power supply includes an input stage power converter and an output stage power converter. The input stage power converter includes a plurality of series connected boost switches and a power factor correction controller. The power factor correction controller may direct the operation of the boost switches with series interleave phasing to perform power factor correction and voltage regulation. The boost switches are supplied input voltage and input current from a power source. The input voltage is converted to a DC boost voltage by high frequency series interleaved switching of the boost switches. The DC boost voltage is converted to a DC output voltage by the output stage power converter. The DC output voltage is provided on a DC rail for a load of the power factor correcting power supply.

60 Claims, 14 Drawing Sheets

U.S. PATENT DOCUMENTS

| | | | |
|---|---|---|---|
| 6,272,027 | B1 | 8/2001 | Fraidlin et al. |
| 6,320,772 | B1 | 11/2001 | Doyama et al. ............... 363/89 |
| 6,373,734 | B1 | 4/2002 | Martinelli |
| 6,388,429 | B1 | 5/2002 | Mao |
| 6,465,990 | B2 | 10/2002 | Acatrinei et al. |
| 6,531,854 | B2 | 3/2003 | Hwang |
| 6,587,356 | B2* | 7/2003 | Zhu et al. ..................... 363/17 |
| 6,906,930 | B2* | 6/2005 | Jang et al. ..................... 363/17 |
| 6,949,915 | B2 | 9/2005 | Stanley |
| 2002/0001210 | A1 | 1/2002 | Kuranuki et al. ............. 363/98 |
| 2002/0140407 | A1 | 10/2002 | Hwang ....................... 323/207 |
| 2003/0107859 | A1 | 6/2003 | Pan et al. ..................... 361/58 |

FOREIGN PATENT DOCUMENTS

| | | |
|---|---|---|
| EP | 1 089 422 A2 | 4/2001 |
| JP | 10248246 A | 9/1998 |
| JP | 2000-139079 | 5/2000 |
| JP | 2001-45763 | 2/2001 |
| JP | 2001-161071 | 6/2001 |
| JP | 2001-346380 | 12/2001 |
| JP | 2003023775 A | 1/2003 |

OTHER PUBLICATIONS

Y. Jiang and F.C. Lee, "Three-Level Boost Converter for and Its Application in Single-Phase Power Factor Correction," *Virginia Power Electronics Center*, 1994, no month.

"Switched-mode Power Supply Control Circuit," *Phillips Semiconductors Product Specification*, Aug. 1994.

Michael T. Zhang, Yimin Jiang, Fred C. Lee, Milan M. Jovanovic, "Single-Phase Three-Level Boost Power Factor Correction Converter," *IEEE*, 1995, no month.

"Enhanced High Power Factor Preregulator," *Texas Instruments*, Jun. 1998.

Gerald R. Stanley and Kenneth M. Bradshaw, "Precision DC-to-AC Power Conversion by Optimization of the Output Current Waveform—the Half-Bridge Revisited", *IEEE Transactions on Power Electronics*, vol. 14, No. 2, Mar. 1999.

Cecati, C.; Dell'Aquila, A.; Liserre, M. and Monopoli, V.G., "Design of H-Bridge Multilevel Active Rectifier for Traction Systems", IEEE Transactions on Industry Applications, pp. 1541-1550, vol. 39, No. 5, Sep./Oct. 2003.

Cecati, C.; Dell'Aquila, A.; Liserre, M. and Monopoli, V.G., "A Passivity-Based Multilevel Active Rectifier with Adaptive Compensation for Traction Applications", IEEE Transactions on Industry Applications, pp. 1404-1413, vol. 39, No. 5, Sep./Oct. 2003.

Tolbert, L.M.; Peng, F.Z.; and Habetler, T.G., " Multilevel Coverters for large Electric Drives", IEEE Transactions on Industry Applications, pp. 36-44, vol. 35, No. 1, Jan./Feb. 1999.

Lai, J.S. and Peng, F.Z., " Multilevel Coverters —A New Breed of Power Converters", IEEE Transactions on Industry Applications, pp. 509-517, vol. 32, No. 3, May/Jun. 1996.

Carrara, G.; Gardella, S.; Marchesoni, M.; Salutari, R. and Sciutto, G., "A New Multilevel PWM Method: A Theoretical Analysis", IEEE Transactions on Industry Applications, pp. 497-505, vol. 7, No. 3, Jul. 1992.

Rippel, W.E., Optimizing Boost Chooper Charger Design, Jet Propulsion Laboratory Proceedings of Power Con 6, pp. D1-1-D1-19, May 1979.

Crebier, J.C.; Brunello, M.; and Ferrieux, J.P., "EMI analysis of full bridge PFC rectifiers, " pp. 1-10, in Proc. EPE Conf. 1999.

Power Electronics Converters, Application and Design, Chp. 8-3 Single Phase Inverters, pp. 211-225, 2nd Ed. New York: Wiley, 1995.

Acik, A., and Cadirci, I., "Active Clamped ZVS Forward Converter with Soft-Switched Synchronous Recitifier,"Turk J Elec Engin, pp. 473-491, vol. 10, No. 3, 2002, © Tübítak.

Walters, M., "An Integrated Synchronous-Recitifier Power IC with Complementary-Switching (HIP5010, HIP5011)," Technical Brief, Jul. 1995, TB332, pp. 4-99-4-102; © Intersil Corporation, 1998.

G. Escobar, D. Chevreau, R. Ortega and E. Mendes, A Passivity-Based Controller for the Regulation of a Unity Power Factor Recitifier Using a Full Bridge Boost Circuit: Stability Analysis and Experimental Results, pp. 451-456. (no date).

J.R. Pinheiro, D.L.R. Vidor and H.A. Gründling, "Dual Output Three-Level Boost Power Factor Correction Converter with Unbalanced Loads," Federal University of Santa Maria, CT-DESP-NUPEDEE, Campus Universitario-UFSM-Camobi-Santa Maria-RS-CEP.-97.119-900, Brazil, Power Electronics Specialists Conference, vol. 1, pp. 733-737, 1996. (no month).

Barbosa, P., Canales, F., Lee, F., "Analysis and Evaluation of the Two-Switch Three-Level Boost Recitifier," 32nd Annual IEEE Power Electronics Specialists Conference, PESC 2001, Conference Proceedings, Vancouver Canada, Jun. 17-21, 2001; Annual Power Electronics Specialists Conference, New York, NY: IEEE, U.S. vol. 1 of 4, Conf. 32, Jun. 17, 2001, pp. 1659-1664, XP010559466.

Huang, X., Wang, X., Ferrel, J. Nergaard, T., Lai, J.S., "Parasitic Rining and Design Issues of High Power Interleaved Boost Converters," 33rd Annual IEEE Power Electronics Specialists Conference Proceedigns, Cairns, Queensland, Australia, jun. 23-27, 2002; Annual Power Electronics Specialists Conference, New York, NY: IEEE, US, vol. 2 of 4, Conf. 33, Jun. 23, 2002, pp. 30-35; XP010596061.

Baggio, J.E., Hey, H.L., Grundling, H.A., Pinheiro, J.R., "Discrete Control for Three-Level Boost PFC Converter," INTELEC 2002, 24th International Telecommunications Energy Conference, Montreal, Quebec, Canada, Sep. 29 -Oct. 23, 2002, Intelec, International Telecommunications Energy Conference, New York, NY: IEEE, US, Vol. Conf. 24, sep. 29, 2002, pp. 627-633, XP010614688.

Naim, R., Weiss, G., Ben--Yaakov, S., "$H^{Infinity}$ Control of Boost Converters: Comparison to Voltage Mode, Feedforward and Current Mode Controls," Record of the Annual Power Electronics Specialists Conference (PESC). Atlanta, Jun. 12-15, 1995, New York, IEEE, US, vol. 2,Conf. 26, Jun. 12, 19995, pp. 1327-1332, XP000548027.

Lui, J., Chen, W., Zhang, J. Xu, D., Lee, F.C., "Evaluation of Power Losses in Different CCM Mode Single-Phase Boost PFC Converters via a Stimulation Tool," Conference Record of the 2001 IEEE Industry Applications Conference record of the IEEE Industry Applications Conference, IAS Annual Meeting, New York, NY: IEEE, US, vol. 1 of 4, Conf. 36, Sep. 30, 2001, pp. 2445-2459, XP010562026.

\* cited by examiner

SERIES INTERLEAVED BOOST CONVERTER POWER FACTOR CORRECTING POWER SUPPLY

The following commonly owned U.S. patent is related to this application: U.S. Pat. No. 6,949,915, issued Sep. 27, 2005, entitled OPPOSED CURRENT CONVERTER POWER FACTOR CORRECTING POWER SUPPLY.

BACKGROUND OF THE INVENTION

1. Technical Field

The invention generally relates to power supplies and, more particularly, to a power supply that performs power factor correction with series interleaved phasing.

2. Related Art

Power supplies are utilized as a source of power in many electrical devices including most devices having electronic circuits. A power supply may utilize input power from a single phase or a multiple phase alternating current source to produce output power. The output power may be produced at one or more predetermined voltages with a determined range of output current. The output power may be alternating current (AC) or direct current (DC) of almost any magnitude depending on the load the power supply is serving.

Some power supplies and associated electrical device loads may be classified as non-linear power electronic loads. Such non-linear power electronic loads typically include rectifier/capacitor input stages that are characterized by an undesirably low power factor due to excessive load current harmonics. Load current harmonics cause an increase in the magnitude of RMS current supplied to such a non-linear power electronic load. Harmonic currents result in a reduction in power factor since harmonic currents do not provide useful power to the non-linear power electronic load.

Multiple kilowatt non-linear power electronic loads, such as a high power audio amplifier or a magnetic resonance imaging gradient amplifier, place significant current demands on a source of input power. A power feed from a source of input power may be supplied to a load from a circuit breaker with limited current carrying capacity. For example, a power feed that is a single phase power distribution system may be supplied from a circuit breaker that is rated for fifteen amps of sustained RMS current at near unity power factor. When a load with a low power factor is present, the RMS current requirement is higher, and the circuit breaker may open the power feed even though the load is not productively utilizing substantial power.

Power factor correction (PFC) may be used to decrease the magnitude of additional RMS current resulting from harmonics. Power factor correction may involve working to maintain the sinusoidal waveform of current drawn from an AC power source in phase with the sinusoidal waveform of voltage drawn from the AC power source. For non-linear power electronic loads, there are passive and active power factor correction approaches. Passive approaches include series inductor filters and resonant filters. Active approaches include boost derived converters and other switch mode based systems.

In general, boost derived converters utilize switching frequencies higher than the frequency of the source of input power (typically 50–60 Hz) to control the shape of the input current waveform. The higher switching frequencies may result in undesirably high levels of ripple frequencies (e.g. distortion). In addition to power factor correction, boost derived converters that are referred to as universal input boost converters have the capability to accept a range of input voltages such as 100 VAC nominal (Japan), 120 VAC nominal (United States) and 230 VAC nominal (Europe). Boost derived converters may also provide voltage regulation of the output voltage of the converter.

Power supplies that include a boost derived converter may include a bridge rectifier, a second stage, and a first stage that includes an inductor, a switch, a diode and a capacitor. AC power is rectified by the rectifier and used to magnetize the inductor. The switch is opened and closed with a high frequency time varying duty cycle to magnetize and demagnetize the inductor. The capacitor is charged with the energy discharged from the inductor during the demagnetization portion of the duty cycle. The voltage across the capacitor is a DC boost voltage that is provided to the second stage. The second stage converters the DC boost voltage to a DC output voltage of the power supply.

One type of boost converter known as a three-level boost converter may include an output having a capacitor voltage divider. The three-level boost converter includes an inductor and a pair of boost sub-circuits. The pair of boost sub-circuits are electrically connected in series and each include a switch, a capacitor and a diode. The series connection allows reduction in the voltage rating of the boost derived converter to half that of other boost derived converters since each boost sub-circuit operates to provide half of the boost voltage. At light loads, however, equal voltage may not be produced across the capacitors. The voltage imbalance may result in unbalanced operation of the three level boost converter resulting in stress on the boost sub-circuits.

Some PFC boost derived converters operate in a discontinuous conduction mode (DCM) with switch mode operation. To minimize ripple current associated with such switch mode operation, some boost derived converters, such as the three-level boost converter, operate with interleave. Interleave operation involves multiple switches in the boost derived converter that are operated sequentially during a switching period to increase ripple frequency while reducing ripple magnitude. The reduction in ripple magnitude further decreases undesirable line currents and therefore improves power factor. Increased ripple frequency results in cancellation of ripple current at the switching frequency, at sidebands of the switching frequency, at odd harmonics of the switching frequency and at sidebands of the odd harmonics. The reduced magnitude of ripple current, however, still creates undesirable load currents. In addition, with the previously discussed unbalanced conditions of the three-level boost converter, reduction in ripple current may be adversely affected due to incomplete ripple cancellation.

Therefore a need exists for a power factor correcting power supply with greater power efficiency and lower ripple currents that does not suffer from internal voltage imbalances.

SUMMARY

This invention provides a power factor correcting power supply for supplying DC power from an AC power source. The power factor correcting power supply includes an input stage power converter and an output stage power converter. The input stage power converter operates as a boost converter to convert an input voltage (Vin) to a first DC voltage that is a boost voltage (Vboost). The output stage converter operates as a DC to DC converter to convert the boost voltage to a second DC voltage that is a DC output voltage. The DC output voltage is an isolated voltage that is provided to DC rails to supply a load, such as an audio amplifier, supplied power by the power factor correcting power supply.

The input stage power converter includes a plurality of boost switches that are coupled in series. The boost switches are also configured to be coupled in parallel across an AC input voltage. The AC input voltage provided to the boost switches may be a rectified AC input voltage or may be an un-rectified AC input voltage. The input stage power converter also includes a power factor correction (PFC) controller. The boost switches may be independently controlled by the PFC controller to perform power factor correction and voltage regulation of the DC output voltage. The boost switches are switched at high frequency with series interleave by the PFC controller to reduce ripple current and improve power factor.

Each of the boost switches may be included in a boost sub-circuit. A first and second boost sub-circuit may be coupled in series and included in a first boost converter. A second boost converter may include a third boost sub-circuit and a fourth boost sub-circuit coupled in series. The first and second boost converters may be coupled in series and included in the input stage power converter. When the power factor correction power supply is only capable of consuming power from the power source, each of the boost sub circuits may include a diode. Alternatively, when the power factor correction power supply is capable of consuming power from or supplying power to the power source, each of the boost sub-circuits may include a boost sub-switch coupled in series with a respective boost switch.

The boost switches are independently directed to open and close at a selected duty cycle by the PFC controller. The boost switches are directed to switch with same frequency. In addition, the boost switches are directed to switch with interleaved phasing such that the switching duty of each boost switch is sequentially phased within a switching cycle. The duty cycle of each of the boost switches magnetizes and demagnetizes a boost inductor included in the input stage power converter. The boost inductor may be magnetized by the power source. Demagnetization of the boost inductors provides a peak charging current (Ic) and a pulse width modulation (PWM) voltage (Vc) with a sinusoidal waveform that may charge a boost capacitor included in the input stage power converter. The boost capacitor may be charged to a charging voltage by the PWM voltage (Vc) and the charging current (Ic). The charging voltage may be at least a portion of the boost voltage (Vboost).

The sinusoidal waveform of the PWM voltage (Vc) may be generated by the PFC controller with the boost switches to improve the power factor. The average amplitude of the PWM voltage (Vc) waveform is controlled to be substantially similar to the amplitude of the waveform of the AC input voltage (Vin). The AC current waveform may therefore be maintained substantially in phase with the waveform of the AC input voltage (Vin) and power factor is improved. The duty cycle of the boost switches is further controlled by the PFC controller to compensate for a range of magnitudes of AC input voltage (Vin), such as from about 90 VAC to about 265 VAC. The AC input voltage (Vin) may be used to produce a total boost voltage (Vboost), such as about 380 to 400 VDC.

The PFC controller also regulates the DC output voltage of the power factor correcting power supply with the boost switches. Regulation of the DC output voltage involves changing the overall voltage gain of the PFC controller and thus the magnitude of PWM voltage (Vc) generated with the boost switches. Voltage regulation by the PFC controller may be based on the measured input voltage (Vin), the measured DC output voltage and the measured input current (Iin). In addition, further stabilization of the overall voltage gain may be achieved using the measured boost voltage (Vboost).

One feature of the power factor correcting power supply involves the output stage power converter. When the input stage power converter includes multiple boost converters and therefore multiple boost capacitors, the output stage power converter is configured to maintain the charging voltage on the boost capacitors about equally. When the voltage contribution to the boost voltage (Vboost) is higher from one of the boost converters, the output stage power converter may consume additional voltage and current from that boost converter until the charging voltages are substantially equal again. The output stage power converter may then consume voltage and current from all the boost converters at substantially the same rate.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

This invention includes a power factor correcting power supply. The power factor correcting power supply provides a regulated output voltage(s) using high efficiency switch mode operation. In addition, the power supply minimizes harmonics and ripple current. The power supply operates as a non-linear power electronic load with power factor correction (PFC) to increase the input power factor towards unity.

Figure 1:
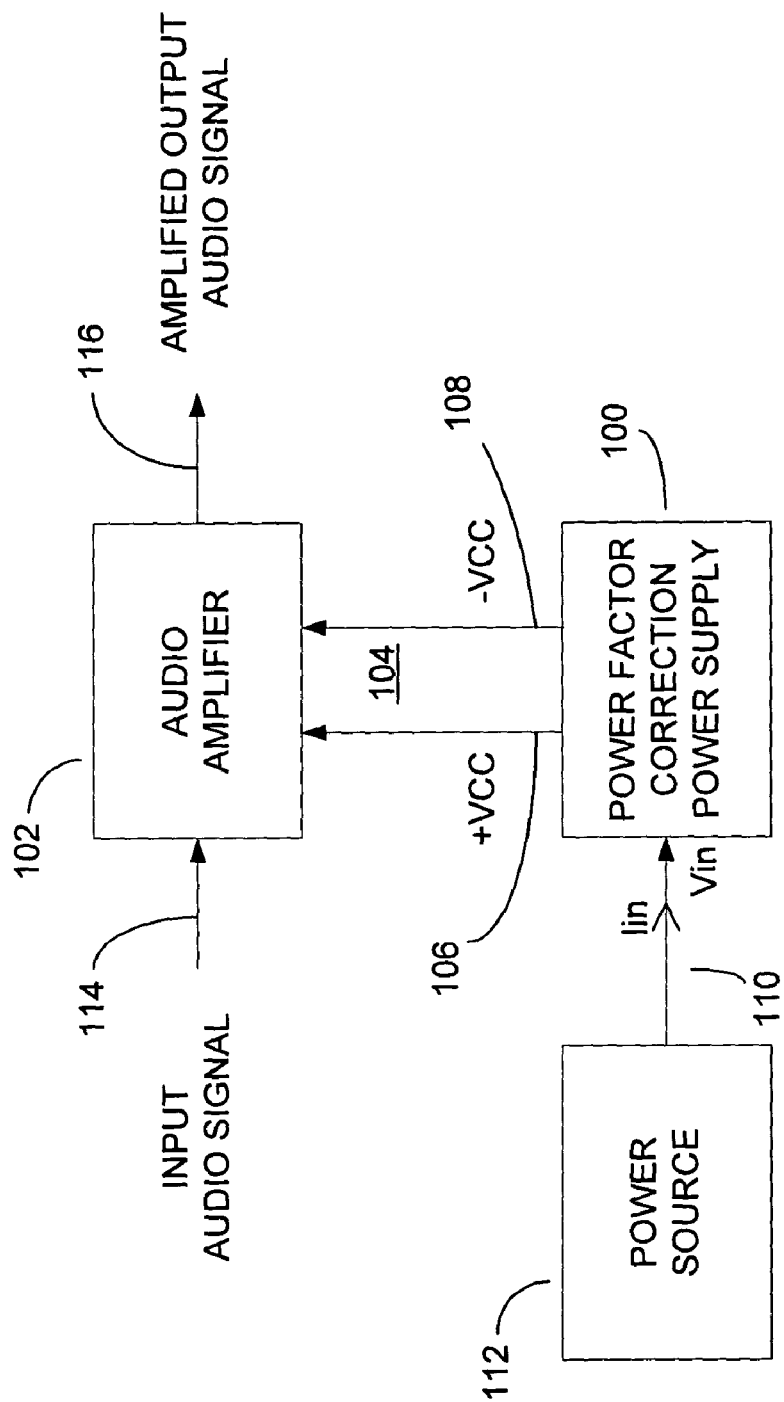
FIG. 1 is a block diagram illustrating a power factor correcting power supply and an audio amplifier.

FIG. 1 is a block diagram of a power factor correcting power supply 100 in an example application supplying regulated DC voltage to an audio amplifier 102. The power factor correcting power supply 100 provides output power on one or more output power lines 104. In the illustrated example, the output power lines 104 include a positive DC output voltage (+Vcc) provided on a positive DC rail 106, and a negative DC output voltage (−Vcc) provided on a negative DC rail 108. Other examples of the power factor correcting power supply 100, may include fewer or greater numbers of output voltages and rails. The power factor correcting power supply 100 also includes an input line 110. Input voltage (Vin) and input current (Iin) from a power source 112, such as an AC line, may be provided on the input line 110.

In FIG. 1, DC output power in the form of positive DC output voltage (+Vcc) and negative DC output voltage (−Vcc) is supplied to positive and negative DC rails of the audio amplifier 102. Utilizing the DC output power supplied by the power factor correcting power supply 100, the audio amplifier 102 may amplify an input audio signal received on an audio signal input line 114 to produce an amplified output audio signal on an amplified audio signal line 116. For example, the input audio signal may originate from a microphone and the amplified output audio signal may drive a loudspeaker. In other examples, other loads may source power from the power factor correcting power supply 100.

Figure 2:
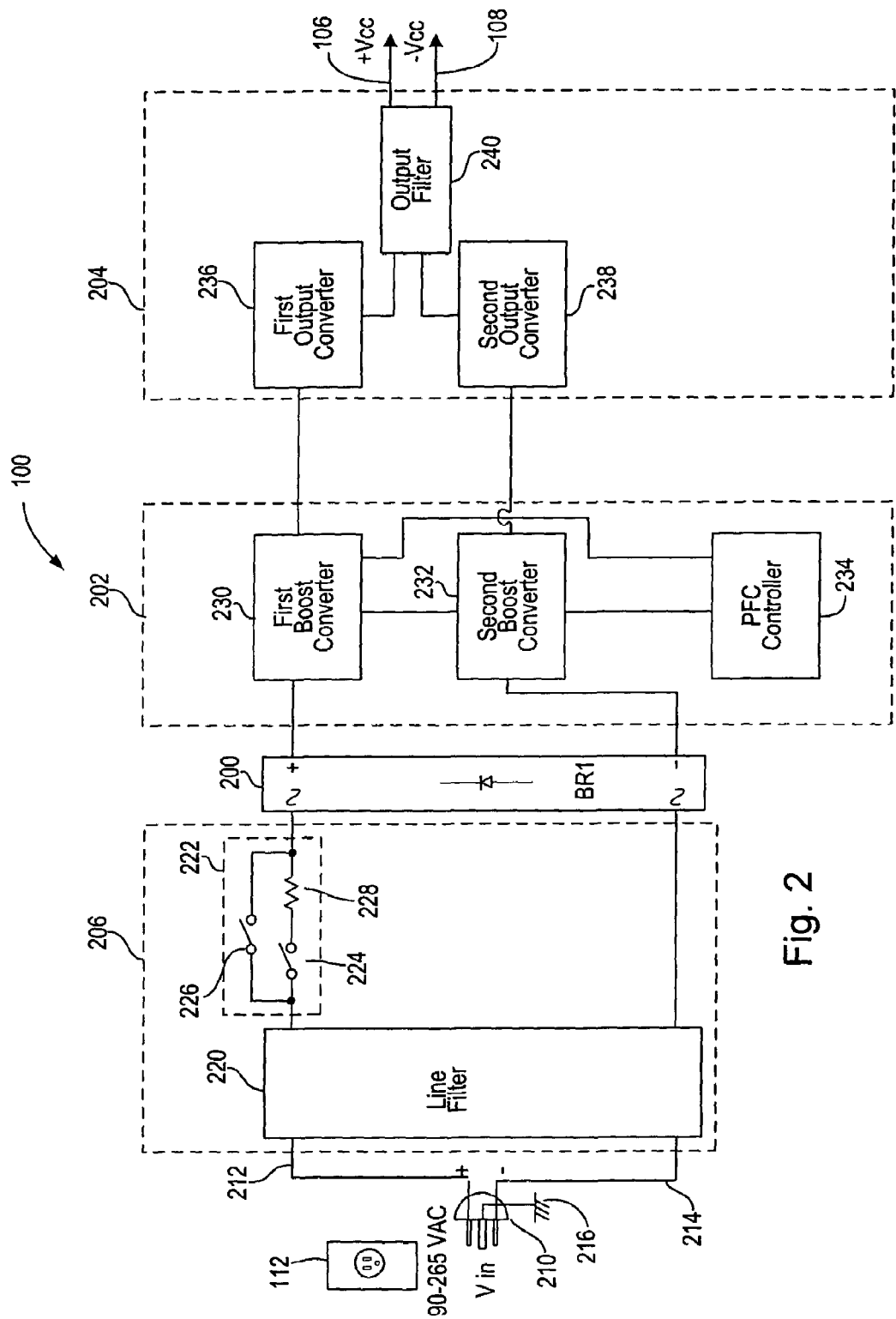
FIG. 2 is a more detailed block diagram of the power factor correcting power supply illustrated in FIG. 1.

FIG. 2 is a more detailed block diagram of an example of the power factor correcting power supply 100. The power factor correcting power supply 100 includes a full wave bridge rectifier (BR1) 200, an input stage power converter 202 and an output stage power converter 204. The power factor correcting power supply 100 may also include a pre-stage 206. As in FIG. 1, the power source 112 supplies power to the power factor correcting power supply 100. Input voltage (Vin) supplied by the power source 112 may be in a range of, for example, about 90 VAC to about 265 VAC.

In the illustrated example, the power factor correcting power supply 100 includes a power plug 210 capable of being detachably coupled with a single phase outlet that is the power source 112. The power plug 210 may include a feeder line 212, a common line 214 and a ground 216. In other examples, other voltage ranges, numbers of phases and interconnections to the power source 112 are possible. As used herein, the terms "connected," "coupled" and "electrically coupled" are intended to broadly encompass both direct and/or indirect connections capable of conducting voltage and current between components and/or devices.

The pre-stage 206 may include a line filter 220 and a softstart circuit 222. The line filter 220 may be any form of filter capable of reducing electromagnetic interference (EMI) caused by input current ripple of the power factor correcting power supply 100. The softstart circuit 222 may include a first startup switch 224, a second startup switch 226 and a resistor 228 such as a positive temperature coefficient resistor. The first and second startup switches 224 and 226 may be operated to moderate inrush current during startup by switching in the resistor 228. In addition, first and second startup switches 224 and 226 may be opened upon detection of a fault to prevent the flow of fault current to the power factor correcting power supply 100. Where EMI and soft start are not an issue, the pre-stage 206 is unnecessary.

The full wave bridge rectifier (BR1) 200 may be any circuit configuration that rectifies each half cycle of a sinusoidal waveform. In one example, the full wave bridge rectifier 200 includes four rectifying diodes connected in a bridge. In this configuration, each half cycle of a sinusoidal wave is rectified by a pair of diodes that are in opposite quarters of the bridge and in series with each other. The full wave bridge rectifier (BR1) 200 rectifies the input voltage (Vin) on the feeder line 212 and the common line 214. The rectified AC input voltage (Vin) is provided to the input stage power converter 202.

The input stage power converter 202 is electrically coupled in parallel with the rectified AC input voltage (Vin). The input stage power converter 202 includes a positive boost converter that is a first boost converter 230 and a negative boost converter that is a second boost converter 232. In addition, the input stage power converter 202 includes a power factor correction (PFC) controller 234. In other examples, larger numbers (odd or even numbers) of boost converters may be included in the input stage power converter 202 The first and second boost converters 230 and 232 are electrically coupled in series across the rectified AC input voltage (Vin). The rectified AC input voltage (Vin) is divided between the first and second boost converters 230 and 232.

The first boost converter 230 operates as an AC to DC boost converter to raise about half of the recitified AC input voltage (Vin) to about half of a DC boost voltage (Vboost) such as between about 190 VDC and about 200 VDC. The second boost converter 232 similarly operates as an AC to DC boost converter to raise about half of the AC input voltage (Vin) to about half of the boost voltage (Vboost). Accordingly, the first and second boost converters 230 and 232 cooperatively operate to each supply half of the total boost voltage (Vboost) provided to the output stage power converter 204.

The PFC controller 234 controls the first and second boost converters 230 and 232. The PFC controller 234 may be a circuit or device capable of directing the first and second boost converters 230 and 232 to perform power factor correction and voltage regulation. Power factor correction and voltage regulation by the PFC controller 234 is based on voltage and current sensed by the PFC controller 234.

Figure 3:
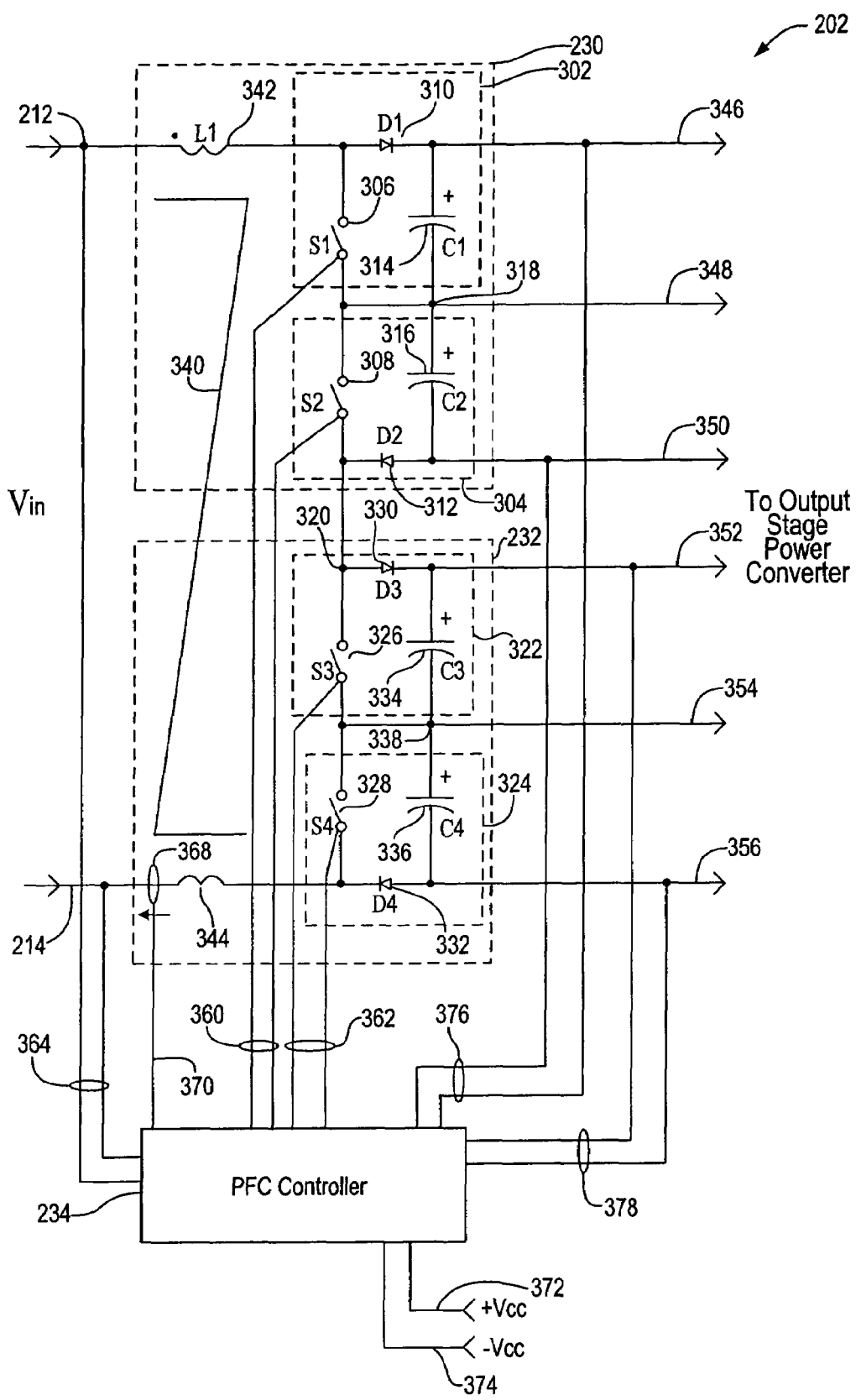
FIG. 3 is a circuit schematic of an input stage power converter included in the power factor correcting power supply illustrated in FIG. 2.

FIG. 3 is a circuit schematic of the input stage power converter 202. The input stage power converter 202 includes the first boost converter 230, the second boost converter 232 and the power factor correction controller 234. The first boost converter 230 includes a first boost sub-circuit 302 and a second boost sub-circuit 304. The first and second boost sub-circuits 302 and 304 are electrically coupled in series within the first boost converter 230. The first and second boost sub-circuits 302 and 304 include a first pair of boost switches that are first and second boost switches (S1, S2) 306 and 308, a first pair of boost diodes that are first and second diodes (D1, D2) 310 and 312, and a first pair of boost capacitors that are first and second boost capacitors (C1, C2) 314 and 316, respectively. The first and second boost capacitors (C1, C2) 314 and 316 are electrically coupled through a positive centerpoint 318.

The first boost converter 230 and the second boost converter 232 are electrically coupled through a converter centerpoint 320. The negative boost converter 304 includes a third boost sub-circuit 322 and a fourth boost sub-circuit 324. The third and fourth boost sub-circuits 322 and 324 are similarly electrically coupled in series within the second boost converter 232. The third and fourth boost sub-circuits 322 and 324 include a second pair of boost switches that are third and fourth boost switches (S3, S4) 326 and 328, a second pair of boost diodes that are third and fourth boost diodes (D3, D4) 330 and 332, and a second pair of capacitors that are third and fourth boost capacitors (C3, C4) 334 and 336, respectively. The third and fourth boost capacitors (C3, C4) 334 and 336 are electrically coupled through a negative centerpoint 338.

The input stage 202 also includes a boost inductor (L1) 340. The boost inductor (L1) 340 is illustrated as wound in a first segment 342 and a second segment 344 to reduce common-mode electromagnetic interference (EMI). The first segment 342 is electrically coupled in series between the feeder line 212 and the first boost sub-circuit 302. The second segment 344 is electrically coupled in series between the common line 214 and the fourth boost sub-circuit 324. Alternatively, the boost inductor 340 may be built with one winding, or may be two or more separate inductors. A portion of the boost inductor (L1) 340 may also appear as centerpoint 320.

The rectified AC input voltage (Vin) is divided between the first and second boost converters 230 and 232. The rectified AC input voltage (Vin) is further divided across the series connected boost sub-circuits 302, 304, 322 and 324. For example, if the AC input voltage (Vin) is about 265 Vrms, each of the boost sub-circuits 302, 304, 322 and 324 may process about 95 VAC.

One side of the first boost switch (S1) 306 and the anode of the first boost diode (D1) 310 are electrically coupled with the first segment 342. The first boost capacitor (C1) 314 is electrically coupled across the cathode of the first boost diode (D1) 310 and the other side of the first boost switch (S1) 306. One side of the second boost switch (S2) 308 is also coupled to the other side of the first boost switch (S1) 306 to place the first and second boost switches (S1, S2) 306 and 308 in series. The second, third and fourth boost sub-circuits 304, 322 and 324 are electrically connected similar to the first boost sub-circuit 302.

Coupled between the first boost diode (D1) 310 and the first boost capacitor (C1) 314 is a first positive boost converter output line 346. A positive midpoint line 348 is coupled to the positive centerpoint 318 between the first boost capacitor (C1) 314 and the second boost capacitor (C2) 316. Coupled between second boost diode (D2) 312 and the second boost capacitor (C2) 316 is a second positive boost converter output line 350. A first negative boost converter output line 352, a negative midpoint line 354 and a second negative boost converter output line 356 are similarly coupled with the second boost converter 232.

The first and second boost capacitors (C1,C2) 314 and 316, as well as the third and fourth boost capacitors (C3, C4) 334 and 336 are independently electrically coupled in series pairs. The magnitude of the boost voltage (Vboost) is therefore divided between the boost capacitors (C1, C2, C3, C4) 314, 316, 334 and 336. For example, if the AC input voltage (Vin) is about 265 Vrms, and the total boost voltage (Vboost) is about 380 VDC to about 400 VDC, each of the boost sub-circuits 302, 304, 322 and 324 may process about 95 VAC to generate a part of the boost voltage (Vboost) of about 95 VDC. In other examples that include additional boost converters and boost capacitors, the input voltage (Vin) may be further divided.

The series connected boost sub-circuits 302, 304, 322 and 328 may operate to convert the AC input voltage (Vin) to a DC boost voltage (Vboost) while filtering the line ripple currents by the optimum use of series interleave. Series interleaved operation involves operating the boost sub-circuits 302, 304, 322 and 328 with similar switching frequency but with switching duty that is sequentially phased within a switching cycle (or conversion cycle). As a result of series interleaved operation, the input ripple currents are increased in frequency and minimized in amplitude. Minimization of the ripple current minimizes undesirable AC input current (Iin) and therefore improves power factor. In addition, the line filter 220 (FIG. 2) may be built more economically since the minimized ripple current may require less filtering of the input power.

The boost switches (S1, S2, S3, S4) 306, 308, 326 and 328 may be opened and closed with switching signals that are double-edged natural pulse width modulation (PWM). Natural double edge PWM describes a modulating carrier waveform that is a triangle waveform carrying a signal that is being modulated as a continuous variable of time. Natural double edge PWM may be used to optimize the practice of interleave. When natural double-edged PWM is used, it is possible to cancel all ripple spectrum except the frequencies that are integer multiples of the product of the interleave number and the commutation frequency of each of the boost switches (S1, S2, S3, S4) 306, 308, 326 and 328. In FIG. 3, an independent switching signal may direct each of the boost switches (S1, S2, S3, S4) 306, 308, 326 and 328.

Figure 4:
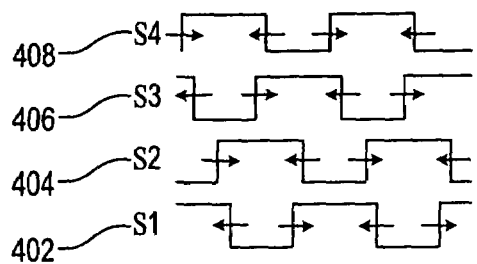
FIG. 4 is a timing diagram of the input stage power converter included in the power factor correcting power supply of FIG. 2.
Figure 4:
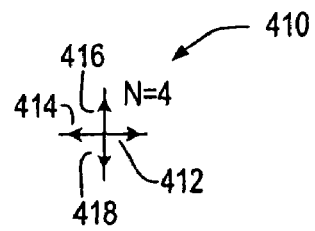

FIG. 4 is a timing diagram illustrating operation of the boost switches (S1, S2, S3, S4) 306, 308, 326 and 328 using interleave phasing with natural double-edge PWM modulation. A first modulation waveform 402 represents the operation of the first boost switch (S1) 306 and a second modulation waveform 404 represents the operation of the second boost switch (S2) 308. Operation of the third boost switch (S3) 326 and operation of the fourth boost switch (S4) 328 are represented by a third modulation waveform 406 and a fourth modulation waveform 408, respectively. In the illustrated modulation waveforms, the input voltage (Vin) from the power source 112 (FIG. 2) may be about 40% of the boost voltage (Vboost), such as about 150 VDC and rising in magnitude. The arrows on the modulation waveforms 402, 404, 406 and 408 indicate a declining boost ratio since input voltage (Vin) is increasing.

Also included in FIG. 4 is a modulation phasing diagram 410. The modulation phasing diagram 410 includes a first vector 412 and a second vector 414 representing modulation of the first and second modulation waveforms 402 and 404, respectively. In addition, modulation of the third and fourth modulation waveforms 406 and 408 are represented by a third vector 416 and a fourth vector 418, respectively. The modulation waveforms 402, 404, 406 and 408 illustrated in FIG. 4 are evenly spaced around the modulation phasing diagram 410 at about 90 degrees apart.

In FIG. 3, the boost inductor (L1) 340 is magnetized and demagnetized by the series interleaved operation of the boost switches (S1, S2, S3, S4) 306, 308, 326 and 328. Power to magnetize the boost inductor (L1) 340 is provided from the power source 112 during each conversion cycle of the boost switches (S1, S2, S3, S4) 306, 308, 326 and 328. Series interleaved operation of the boost switches (S1, S2, S3, S4) 306, 308, 326 and 328 also charges the boost capacitors (C1, C2, C3, C4) 314, 316, 334 and 336 during each conversion cycle. Energy used to charge the boost capacitors (C1, C2, C3, C4) 314, 316, 334 and 336 is derived from the demagnetization of the boost inductor (L1) 340.

During operation, the boost switches (S1, S2, S3, S4) 306, 308, 326 and 328 are opened and closed sequentially. When all of the boost switches (S1, S2, S3, S4) 306, 308, 326 and 328 are open, the input current (Iin) flows through the boost inductor (L1) 340, all the boost capacitors (C1, C2, C3, C4) 314, 316, 334 and 336 and the boost diodes (D1, D2, D3, D4) 310, 312, 330 and 332. The rectified input voltage (Vin) is dropped across the boost inductor (L1) 340, the boost capacitors (C1, C2, C3, C4) 314, 316, 334 and 336 and the boost diodes (D1, D2, D3, D4) 310, 312, 330 and 332. Alternatively, when the boost switches (S1, S2, S3, S4) 306, 308, 326 and 328 are closed, only the boost inductor (L1) 340 is subject to the input current (Iin) and the rectified input voltage (Vin).

All of the boost switches (S1, S2, S3, S4) 306, 308, 326 and 328 may be activated to close. The boost inductor (L1) is therefore magnetized by the input current (Iin) and the input voltage (Vin) to store energy. When the first boost switch (S1) 306 is opened, the energy in the boost inductor (L1) is transferred to the first boost capacitor (C1) 314. The first boost switch (S1) 306 may then be opened to allow additional energy storage in the boost inductor (L1) 340. By sequentially closing and opening the remaining boost switches (S2, S3, S4) 308, 326 and 328 with series interleave, the respective boost capacitors (C2, C3, C4) 316, 334 and 336 may be similarly charged with energy supplied by the boost inductor (L1) 340.

By switching the boost switches (S1, S2, S3, S4) 306, 308, 326 and 328 at relatively high frequency when compared to the frequency of the input voltage (Vin), the respective boost capacitors (C1, C2, C3, C4) 314, 316, 334 and 336 may be charged to a charging voltage that is higher than the input voltage (Vin). The combined magnitude of the charging voltages on the boost capacitors (C1, C2, C3, C4) 314, 316, 334 and 336 may be the boost voltage (Vboost). In addition, control of the duty cycle of the boost switches (S1, S2, S3, S4) 306, 308, 326 and 328 may control the waveshape of the input current (Iin) drawn from the power source 112 (FIG. 1) to improve power factor. Further, control of the duty cycle may also provide voltage regulation of the boost voltage (Vboost) by control of the magnitude of charging voltage stored on the boost capacitors (C1, C2, C3, C4) 314, 316, 334 and 336.

In the example of FIG. 3, the four series connected boost sub-circuits 302, 304, 322 and 324 divide the output voltage (Vboost) by a factor of four. Since the switching of the boost switches (S1, S2, S3, S4) 306, 308, 326 and 328 may occur at relatively low voltage, the switching frequency may be increased. In addition, the principal of series interleave phasing is utilized to reduce ripple current. The ripple current reduction factor ($R_{factor}$) may be determined by:

$$R_{factor} = 1/N^2 \qquad \text{EQUATION 1}$$

where N is the number of boost switches. Accordingly in FIG. 3, N=4 and the ripple current is reduced by a factor of 16. In addition, with the use of interleave, the ripple frequency is increased by N. In the example of FIG. 3, the ripple frequency is quadrupled such that switching at 250 KHz may result in a 1 MHz ripple frequency. Due to the reduced ripple current, the boost inductor 340 may be significantly reduced in physical size and inductance. In addition, the filtering requirements of the line filter 220 (FIG. 2) may also be reduced. When additional boost converters are included in the input stage power converter 204, further reduction in ripple current and increase in ripple frequency will be achieved.

The voltage of the boost capacitors (C1, C2, C3, C4) 314, 316, 334 and 336 is boosted above the input voltage (Vin). For example, operation with line voltages (Vin) as high as about 265V RMS may require the voltages of the individual boost capacitors (C1, C2, C3, C4) 314, 316, 334 and 336 to be boosted to about 95 VDC to about 100 VDC. In this example, the boost switches (S1, S2, S3, S4) 306, 308, 326 and 328 and the boost diodes (D1, D2, D3, D4) 310, 312, 330 and 332 may be exposed to a voltage of about 95 V to about 100 V. Since the voltage is relatively low, zero voltage switching is not necessary, but may be implemented.

During startup, the first charging of the boost capacitors (C1, C2, C3, C4) 314, 316, 334 and 336 may come from the line voltage (Vin) and a low frequency peak charging current (Ic). The low frequency peak charging current (Ic) may flow through the boost inductor (L1) 340 and the freewheeling boost diodes (D1, D2, D3, D4) 310, 312, 330 and 332. The boost sub-circuits 302, 304, 322 and 324 therefore do not need to operate to produce the initial boost voltage (Vboost). Inrush currents resulting from initial charging of the boost capacitors (C1, C2, C3, C4) 314, 316, 334 and 336 may be moderated with the softstart circuit 222 (FIG. 2). By closing the first startup switch 224 and leaving open the second startup switch 226 the impedance of the resistor 228 may be used to moderate the inrush currents.

Following startup, the second startup switch 226 may be closed. If a fault condition occurs, both the first startup switch 224 and the second startup switch 226 may be opened to stop the flow of input current (Iin) from the power source 112. Control of operation of the first and second boost converters 230 and 232 is with the PFC controller 234.

The PFC controller 234 controls the switching duty (duty cycle) of the boost switches (S1, S2, S3, S4) 306, 308, 326 and 328. The PFC controller 234 may selectively activate and deactivate the first and second boost switches (S1, S2) 306 and 308 of the first boost converter 230 with independent respective switching signals on positive boost control lines 360. Control of the third and fourth boost switches (S3, S4) 326 and 328 are activated and deactivated by the PFC controller 234 with independent respective switching signals on negative boost control lines 362. The duty cycles of the boost switches (S1, S2, S3, S4) 306, 308, 326 and 328 may be directed by the PFC controller 234 based on voltage and current sensed by the PFC controller 234.

The illustrated PFC controller 234 senses the input voltage (Vin) to the input stage power converter 202 on an input voltage sensing line 364. The input voltage (Vin) may be measured across the input side of the input stage power converter 202 by measuring between the feeder line 212 and the common line 214. The magnitude and waveform of input current (Iin) flowing from the power source 112 may be measured with a current sensor 368 such as a current transformer, a Rogowski coil, a resistive shunt or some other mechanism for sensing AC current. The current sensor 368 may provide a measured input current (Iin) to the PFC controller 234 on an input current sensing line 370. The measured input current (Iin) may be scaled with a scaling factor (Ka) to form a scaled measured input current (Ka*Iin).

The positive DC output voltage (+Vcc) and the negative DC output voltage (−Vcc) present on the positive DC rail 106 and the negative DC rail 108 (FIG. 1) are also sensed by the PFC controller 234 on a positive Vcc sensing line 372 and a negative Vcc sensing line 374, respectively. The PFC controller 234 may also sense the boost voltage (Vboost) of the input stage power converter 202 on positive boost voltage sensing lines 376 and negative boost voltage sensing lines 378. Half of the boost voltage (Vboost) may be measured between the first and second positive boost converter output line 346 and 350 with the positive boost voltage sensing lines 376. The other half of the boost voltage (Vboost) may be measured between the first and second negative boost converter output lines 352 and 356.

Power factor correction by the PFC controller 234 implicitly involves adjustment to the sinusoidal waveform of the AC input current (Iin) supplied to the input stage power converter 202 from the power source 112 (FIG. 1). The sinusoidal waveform of the AC input current (Iin) is implicitly adjusted by adjustment to a pulse width modulation (PWM) voltage (Vc). The term "PWM voltage (Vc)" refers to the average magnitude of the voltage produced by high frequency interleaved switching of the boost switches (S1, S2, S3, S4) 306, 308, 326 and 328. To perform power factor correction, the average magnitude of the PWM voltage (Vc) may be maintained in a sinusoid of the same frequency and phase as the line voltage (Vin). The sinusoid and the average magnitude of the PWM voltage (Vc) may be formed from a higher frequency waveform resulting from the high frequency interleaved switching of the boost switches (S1, S2, S3, S4) 306, 308, 326 and 328. Control of the duty cycle of the boost switches (S1, S2, S3, S4) 306, 308, 326 and 328 may therefore control the average magnitude, the frequency and the phase of the sinusoidal waveform of the PWM voltage (Vc).

By maintaining the average waveform of the PWM voltage (Vc) substantially the same as the sinusoidal waveform of the input voltage (Vin), harmonics are minimized, and the power factor is improved. When the average waveform of the PWM voltage (Vc) and the sinusoidal waveform of the input voltage (Vin) are substantially similar, the waveform of the input current (Iin) is also substantially similar to the input voltage (Vin). Accordingly, the power factor correcting power supply 100 appears as a substantially resistive load from the perspective of the power source 112 (FIG. 1).

Voltage regulation, on the other hand, involves controlling the overall voltage gain of the PFC controller 234 as the input voltage (Vin) and the load on the power factor correcting power supply 100 vary. Control of the voltage gain involves controlling the switching of the boost switches (S1, S2, S3, S4) 306, 308, 326 and 328 to control the magnitude of the PWM voltage (Vc) and a peak charging current (Ic) supplied to the boost capacitors (C1, C2, C3, C4) 314, 316, 334 and 336. The magnitude of the PWM voltage (Vc) may be varied to maintain the desired voltage on the positive DC rail 106 and the negative DC rail 108 (FIG. 1).

Figure 5:
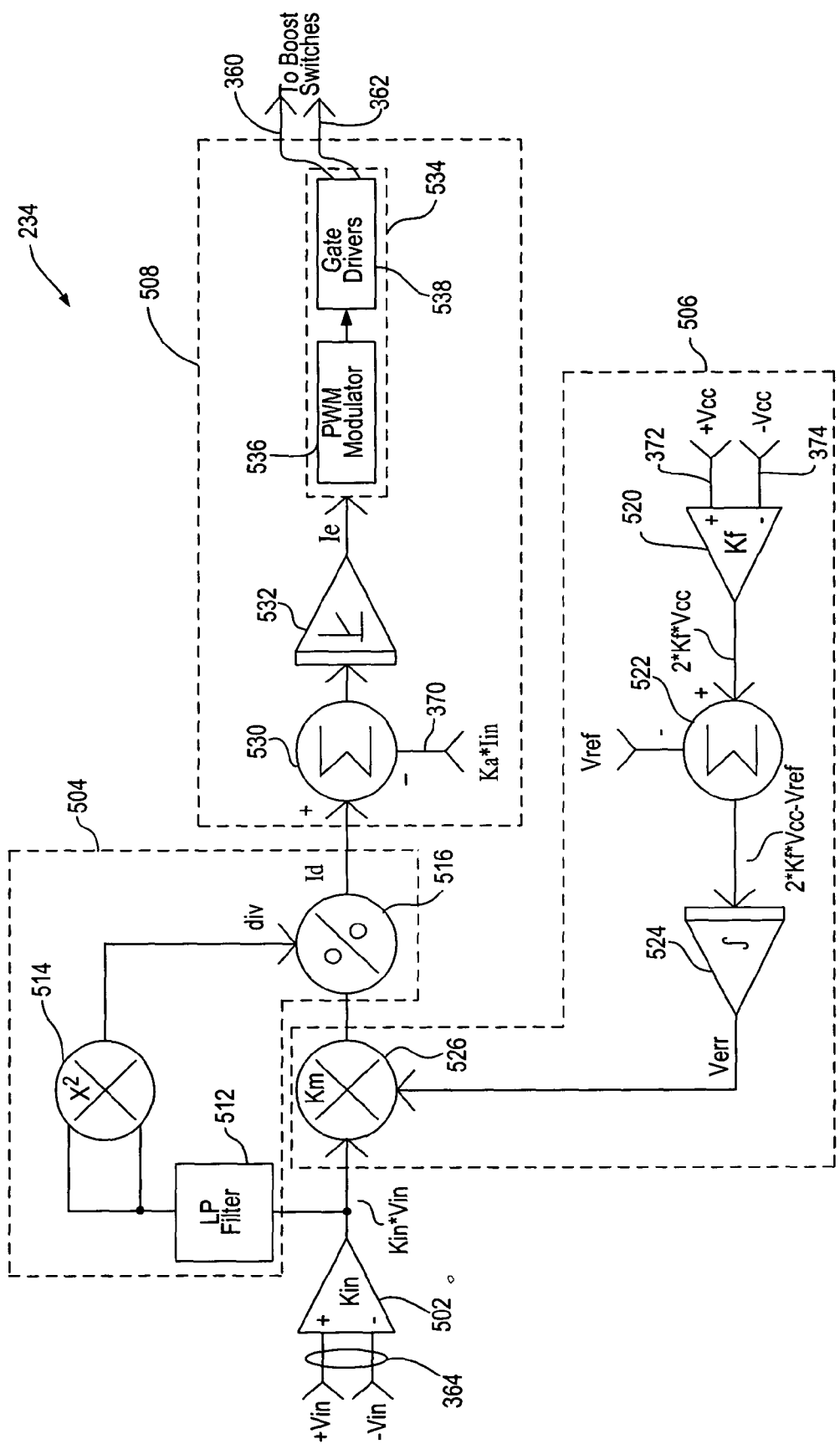
FIG. 5 is a circuit schematic of a power factor correction controller included in the power factor correcting power supply illustrated in FIG. 2.

FIG. 5 is an example of the PFC controller 234 that is similar to Texas Instruments/Unitrode UC3854. The illustrated PFC controller 234 includes a differential amplifier 502, an input voltage feedforward control loop 504, an output voltage feedback control loop 506 and a current controlled inner loop 508. The differential amplifier 502 operates with a scaling factor (Kin) to scale the input voltage (Vin) received on the input voltage sensing lines 364 to a determined voltage magnitude. The scaled input voltage (Kin*Vin) is then provided to the input voltage feedforward control loop 504 and the output voltage feedback control loop 506.

The input voltage feedforward control loop 504 includes a low pass (LP) filter 512, a squaring multiplier 514 and a divider 516. The LP filter 512 operates to extract the DC or average value of the scaled input voltage (Kin*Vin). The input voltage (Vin) has been previously rectified with the bridge rectifier 200 (FIG. 2). The squaring multiplier 514 squares the average value of the scaled input voltage (Kin*Vin) provided by the LP filter 512. The squared value of the scaled input voltage (Kin*Vin) is provided as the denominator of the divider 516.

Control of the duty cycle of the boost switches (S1, S2, S3, S4) 306, 308, 326 and 328 (FIG. 3) may be with the input voltage feedforward control loop 504. The duty cycle may be controlled based on a range of input voltages (Vin) provided to the power factor correcting power supply 100 from the power source 112 (FIG. 1). The input voltage feedforward control loop 504 therefore provides one feedforward technique to keep the input stage power converter 202 (FIG. 2) functioning at steady average input power with changing input voltages (Vin). In other examples, other techniques may be used to achieve similar function.

The output voltage feedback control loop 506 includes a differential receiver 520, a summer 522, an integrator 524 and a multiplier 526. The differential receiver 520 receives the positive DC output voltage (+Vcc) from the positive Vcc sensing line 372, and the negative DC output voltage (−Vcc) from the negative Vcc sensing line 374. The differential receiver 520 may scale the difference of the positive DC output voltage (+Vcc) and the negative DC output voltage (−Vcc).

In single phase applications, the differential receiver 520 may also include a determined gain constant (Kf). The gain constant (Kf) may scale the output voltage of differential receiver 520 to be compatible with the operating voltage of the differential receiver 520. A scaled version of a desired DC output voltage (Vref) is subtracted from the scaled difference voltage (2*Kf*Vcc) by the summer 522. Line current distortion in single-phase circuits may be materially degraded when the response speed of the output voltage feedback control loop 506 is too fast. The control may therefore be slowed with the integrator 524. The integrator 524 may also operate as proportional integrator (PI) controller by including a proportional term in the output of the integrator 524. The output of the summer 522 is integrated by the integrator 524 and provided as a voltage error correction signal (Verr) to the multiplier 526.

The voltage error correction signal (Verr) is a highly filtered signal representative of the error voltage between the actual DC output voltage (+Vcc, −Vcc) and the reference voltage (Vref). The multiplier 526 multiplies the scaled input voltage (Kin*Vin) by the voltage error correction signal (Verr). The multiplier 526 may also include a gain constant (Km) for adjusting the gain coefficient. The result is provided as the numerator to the divider 516, and is scaled by the squared value of the scaled input voltage (Kin*Vin). The divider 516 produces a scaled version of a desired current waveform (Id). The desired current waveform (Id) is one that can achieve substantially unity power factor. The desired current waveform (Id) is provided to the current controlled inner loop 508.

The current controlled inner loop 508 includes a summer 530, an error amplifier 532 and a switch controller 534. The summer 530 subtracts the scaled measured input line current (Ka*Iin) received on the input current sensing line 370 from the desired current waveform (Id) to produce a current error signal. The error amplifier 532 integrates the current error signal and provides a proportional error to form the error signal (Ie) to drive the switch controller 534 to produce the peak charging current (Ic) and the PWM voltage (Vc). The switch controller 534 is driven by the proportional error to control the effective input impedance of the input stage power converter 202 (FIG. 2) by control of the transconductance through the input stage power converter 202.

The effective input impedance of the input stage power converter 202 is the PWM voltage (Vc) subtracted from the input voltage (Vin) divided by the input current (Iin). Control of the effective input impedance controls the phasing of the waveform of the AC input current (Iin) and therefore the power factor. Controlled amounts of negative current feedback may have the effect of increasing the effective input impedance of the input stage power converter 202 (FIG. 2). Variations in the effective input impedance of the input stage power converter 202 may be achieved with the duty cycles of the boost switches (S1, S2, S3, S4) 306, 308, 326 and 328. The duty cycles may be selectively varied to adjust the transconductance and therefore the effective input impedance of the input stage power converter 202.

With the PFC controller 234 illustrated in FIG. 5, control of the transconductance is predominantly based on the input line current (Iin) of the inner current control loop 508. Differences in the magnitude of the PWM voltage (Vc) and the input voltage (Vin) may be determined based on the flow of the input current (Iin). In other words, a larger magnitude of the PWM voltage (Vc) (e.g. higher voltage gain) results in lower peak charging current (Ic). Similarly, a smaller magnitude of the PWM voltage (Vc) (e.g. lower gain) results in a higher peak charging current (Ic). Based on the magnitude of input line current (Iin), the overall voltage gain of the PFC controller 234 may be adjusted.

The switch controller 534 may include a pulse width modulation (PWM) modulator 536 and a plurality of gate drivers 538 to drive the boost switches (S1, S2, S3, S4) 306, 308, 326 and 328. In the example illustrated in FIG. 3, the boost switches (S1, S2, S3, S4) 306, 308, 326 and 328 are driven via the positive boost control lines 360 and the negative boost control lines 362, respectively.

To drive the boost sub-circuits 302, 304, 322 and 324, the PWM modulator 536 may operate with double edged natural PWM to optimize the use of interleave. With double edged natural PWM, the modulating waveform is a triangle waveform and the modulated signal is a continuous variable of time. Accordingly, the PWM modulator operates with an interleave of N, where N equals the number of boost switches and gate drivers 538. In the illustrated example, each of first and second boost converters 230 and 232 (FIG. 2) includes two boost switches (S1, S2, S3, S4) 306, 308, 326 and 328, therefore N=4. In other examples, additional boost switches may be included.

Figure 6:
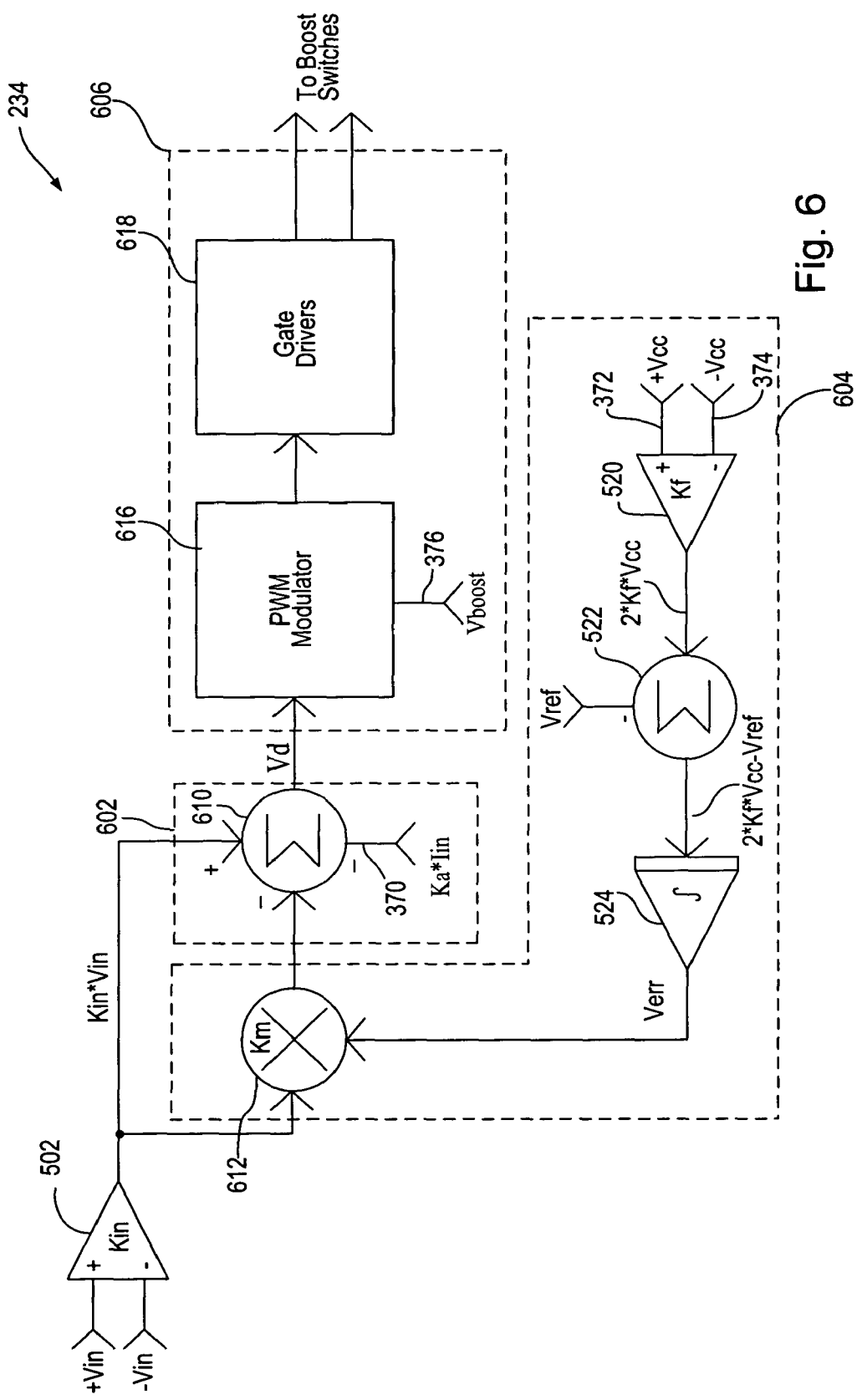
FIG. 6 is another circuit schematic of a power factor correction controller included in the power factor correcting power supply illustrated in FIG. 2.

FIG. 6 is another example of a PFC controller 234 having a different control structure than was discussed with reference to FIG. 5. For purposes of brevity, the following discussion will focus on those differences. In this example, the voltage gain is predominately controlled by the PFC controller 234 based on the input voltage (Vin). The PFC controller 234 of FIG. 6 includes the differential amplifier 502, an input voltage feedforward control loop 602, an output voltage feedback control loop 604 and a voltage controlled inner loop 606. The differential amplifier 502 provides the scaled input voltage (Kin*Vin) to a summer 610 included in the input voltage feedforward control loop 602.

The output voltage feedback control loop 604 includes the differential receiver 520, the summer 522 and the integrator 524 similar to FIG. 5. In addition, the output voltage feedback control loop 604 includes a multiplier 612 that multiplies the scaled input voltage (Kin*Vin) by the voltage error correction signal (Verr). The result is provided to the summer 610. The summer 610 subtracts the voltage error correction signal (Verr*Km*Kin*Vin) and the scaled measured input current (Ka*Iin) from the scaled input voltage (Kin*Vin) to produce a drive signal (Vd) to drive the switch controller 606. The switch controller 606 includes a PWM modulator 616 and a plurality of gate drivers 618.

Similar to the PWM modulator 536 of FIG. 5, the PWM modulator 616 operates with an interleave of N to direct the duty cycle of the boost switches in the boost sub-circuits 302, 304, 322 and 324 (in the example of FIG. 3, N=4). The PWM modulator 616 of FIG. 6, however, also includes an additional feedforward control loop. The boost voltage (Vboost) is provided as a feedforward signal to the PWM modulator 616 on the positive and negative boost voltage sensing lines 376 and 378. The inner voltage control loop 606 provides control of the scaling of the modulating waveform produced by the PWM modulator 616. The modulating triangle waveform may be scaled to be proportional to the desired boost voltage (Vboost). The additional feedforward control loop provides gain stabilization of the drive signal (Vd) provided from the summer 610.

The voltage gain of the voltage controlled inner loop 606 may be fixed. Accordingly, the PWM modulator 616 may be inverse gain compensated for errors in the boost voltage (Vboost) on the boost capacitors. Without such compensation, the gain of the PWM modulator 616 would be proportional to the boost voltage (Vboost) of the boost capacitors, i.e. not fixed but variable. With this control method, the PFC controller 234 includes an inner control loop (voltage controlled inner loop 606) that is linear in duty to provide voltage control when the PWM voltage (Vc) is amplitude controlled based on the boost voltage (Vboost). A similar type of feedforward control loop for gain stabilization may also be implemented in the PFC controller 234 discussed with reference to FIG. 5.

In the example PFC controller 234 of FIG. 6, the input voltage feedforward control loop 602 establishes the scaled input voltage (Kin*Vin) as the dominant signal to the voltage controlled inner loop 606. The voltage controlled inner loop 606 includes a voltage gain of (1/Kin). The voltage gain (1/Kin) cancels (Kin) and leaves only the input voltage (Vin) as the control signal to generate the PWM voltage (Vc) under no load conditions. As a result, during quiescent conditions (e.g. little or no load on the power factor correcting power supply) the input stage powerconverter 202 (FIG. 2) may track the input voltage (Vin) with the PWM voltage (Vc).

The input voltage (Vin) may be tracked by the PWM voltage (Vc) based on a tracking gain ratio. The "tracking gain ratio" is defined as a desired ratio of the magnitude of the peak-to-peak AC input voltage (Vin) to the magnitude of the peak-to-peak AC PWM voltage (Vc). The input stage power converter 202 (FIG. 2) may therefore not transfer power by default. Operation of the input stage power converter 202 using the PFC controller 234 of FIG. 6 may be described as a reverse amplifier form of operation. Reverse amplifier operation is opposite of traditional amplifier operation where the amplifier is driven to have an output of an expected form instead of tracking the input as is the case here.

Since the feedforward control loop operates with the scaled input voltage (Kin*Vin) as the dominant control signal, the impact of the voltage error correction signal (Verr) from the output voltage feedback control loop 604 is minimized. The voltage error correction signal (Verr) may be minimized without compromising voltage regulation of the power factor correcting power supply 100 (FIG. 1) due to the feedforward control provided by the voltage controlled inner loop 606. As a result of the additional feedforward control with the boost voltage (Vboost), the multiplier 612 may manage only a fraction of the feedforward control signal. In addition, the multiplier 612 may have has less dynamic range. Accordingly, the multiplier 612 may be less precise, and less expensive than the multiplier 526 discussed with reference to FIG. 5.

During non-quiescent conditions, the PFC controller 234 of FIG. 6 may use relatively modest amounts of negative current feedback in the form of the scaled measured input current (Ka*Iin) to control the effective input impedance of the input stage power converter 202 (FIG. 2). Control of the effective input impedance controls the power factor as previously discussed.

In addition, during non-quiescent conditions, the overall voltage gain may be adjusted to regulate the DC output voltage (the positive and negative DC output voltages (+Vcc and −Vcc)) of the power factor correcting power supply 100 (FIG. 1). Adjustment of the overall voltage gain may occur through the output voltage feedback control loop 604 as previously discussed. As the overall voltage gain of the PFC controller 234 is varied, the input stage power converter 202 may adjust the amount of power acquired from the power source 112 (FIG. 1) in a well-controlled manner.

The input stage power converter 202 illustrated in FIG. 3 does not allow the return of power to the power source 112 (FIG. 1) since the boost diodes (D1, D2, D3, D4) 310, 312, 330 and 332 (FIG. 3) prevent reverse energy flow toward the power source 112. The input stage power converter 202 of FIG. 3 may therefore operate in the second and fourth quadrants to consume power from the power source 112. If however, the input stage power converter 202 was capable of reverse energy flow to the power source 112, the PFC controller 234 may support control of the boost sub-circuits 302, 304, 322 and 324 to return power to the power source 112. Accordingly, the input stage power converter 202 may operate in the first and third quadrants as a source of power to the power source 112 and the second and fourth quadrants to consume power from the power source 112. When the PFC controller 234 produces an overall feed-forward amplifier gain that is less than unity, power is flowing into the input stage power converter 202. When the overall voltage gain is greater than unity, on the other hand, power is flowing out of the input stage power converter 202 to the power source 112.

To vary the overall voltage gain of the PFC controller 234 to be about unity, the multiplier 612 contributing to control of the voltage gain may be at least a two-quadrant multiplier (operating in quadrants two and four) with the input voltage (Kin*Vin) presented to a bipolar input of the multiplier 612. The overall voltage gain of the PFC controller 234, without consideration of the multiplier 612 and the voltage controlled inner loop 606, may be set to slightly greater than unity by adjusting a scaling factor (Kin) of the scaling amplifier 502 or scaling within the summer 610. The multiplier 612 may therefore be used to reduce the overall voltage gain.

When the input stage power converter 202 may only consume power from the power source 112, the entire needed working range of the multiplier 612 may be two-quadrant. The multiplier 612 may be two-quadrant since the output voltage feedback control loop 604 will only be required to bias the multiplier 612 into operation with the voltage error correction signal (Verr) as loading on the power factor correcting power supply 100 (FIG. 1) increases. Since the input stage power converter 202 of FIG. 3 is not capable of returning power to the power source 112, the multiplier 612 does not need to support four quadrant operation.

Alternatively, if the input stage power converter 202 (FIG. 2) were capable of consuming power from or returning power to the power source 112, the multiplier 612 may support four quadrant operation. In this configuration, the PFC controller 234 may control the input stage power converter 202 to source power to, or consume power from the power source 112 (FIG. 1). In support of four quadrant operation, the overall voltage gain of the PFC controller 234, without consideration of the multiplier 612, and the voltage controlled inner loop 606 may be set to substantially unity. As a result, the multiplier 612 may adjust the overall voltage gain both above and below unity.

Energy may be returned to the power source 112 (FIG. 1) when the boost capacitors of the input stage power converter 202 (FIG. 2) have stored excess energy. The primary causes of excesses of stored energy may be due to surges of the power source 112 and control overshoot in the output voltage feedback control loop 604 or the voltage controlled inner loop 606. Should the voltages on the boost capacitors be hazardous to the input and output stage power converters 202 and 204 (FIG. 2), the PFC controller 234 may disable all switching of the boost switches until the voltage bleeds down to safe levels.

Figure 7:
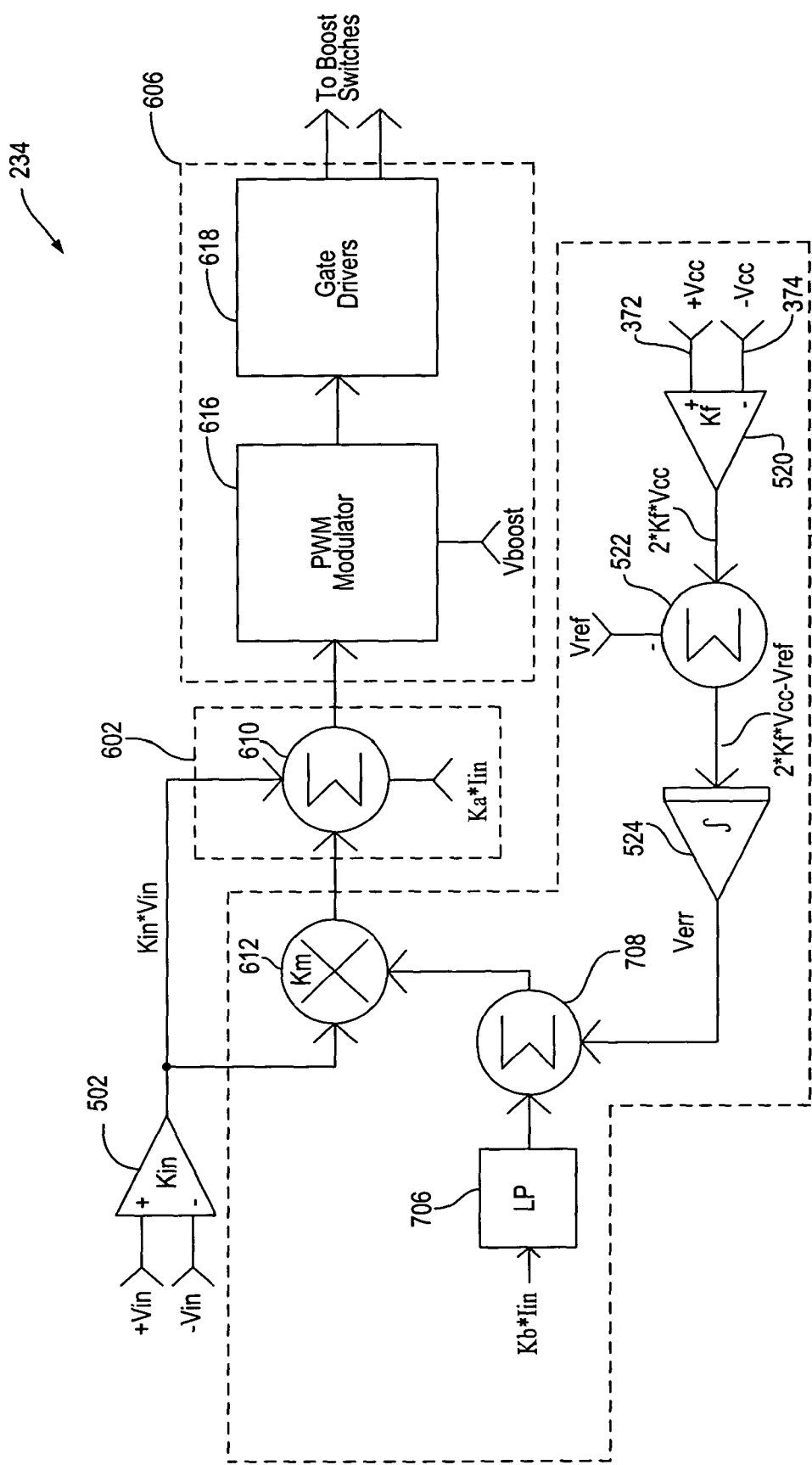
FIG. 7 is another circuit schematic of the power factor correcting power supply illustrated in FIG. 2.

FIG. 7 is yet another example PFC controller 234. The illustrated PFC controller 234 includes the differential amplifier 502, the input voltage feedforward control loop 602 and the voltage controlled inner loop 606 similar to FIG. 6. The differential amplifier 502, the input voltage feedforward control loop 602 and the voltage controlled inner loop 606 all function similarly to the example of FIG. 6. The PFC controller of FIG. 7 also includes an output voltage feedback control loop 702 that is similar to the output voltage feedback control loop 604 discussed with reference to FIG. 6.

The output voltage feedback control loop 702, however, includes the additional elements of a low pass (LP) filter 706 and a summer 708. The low pass filter 706 and the summer 708 introduce the measured input current (Iin) to the output voltage feedback control loop 702. The measured input current (Iin) may be scaled with a scaling factor (Kb) to form a scaled measured input current (Kb*Iin).

The scaled measured input current (Kb*Iin) may be rectified by the bridge rectifier 200 (FIG. 2) and provided to the LP filter 706. Alternatively, the scaled measured input current (Kb*Iin) may be rectified by a rectifier prior to the LP filter 706. The average of the rectified, scaled, measured input current (Kb*Iin) is filtered by the LP filter 706. Following filtering, the filtered, rectified, scaled measured input current (Kb*Iin) is added by the summer 708 to the voltage error correction signal (Verr) to provide "super regulation" of the DC output voltage (the positive and negative DC output voltages (+Vcc and −Vcc)).

Super regulation may be derived by sensing the average magnitude of measured input current (Iin) drawn by the input stage power converter 202 (FIG. 2). The DC output voltage (the positive and negative DC output voltages (+Vcc and −Vcc)) may then be adjusted in response to the average magnitude of measured input current (Iin). When the DC output voltage is raised, the effect is to lower any effective supply impedance and therefore increase the average magnitude of measured input current (Iin). Similarly, when the DC output voltage is lowered, effective supply impedance is raised and the average magnitude of measured input current (Iin) decreases. If sufficient current feedback is applied, the DC output voltage will increase with increased power draw. Such a response is by definition a negative output resistance.

The amount of instantaneous negative current feedback used on the voltage controlled inner control loop 606 may be increased with super regulation. With relatively large amounts of instantaneous negative current feedback, such as in the current controlled inner loop 508 of the PFC controller 234 illustrated in FIG. 5, super regulation is unnecessary. With smaller amounts of negative current feedback as in FIGS. 6 and 7, however, increasing the instantaneous negative current feedback reduces the distortion of the input current (Iin) resulting from small duty-to-voltage conversion errors. As the input impedance of the input stage power converter 202 becomes very low, small distortions in the PWM voltage (Vc) may represent large distortions in the input current (Iin). Increasing the impedance of the first power stage converter 202 through negative current feedback may relax the linearity requirements on the first power stage converter 202. Regulation of the DC output voltage may, however, be affected.

Similar to the PFC controller 234 described with reference to FIG. 6, line current distortion in single phase PFC circuits is materially degraded by a response speed of the output voltage feedback control loop 702 that is too fast. The response speed of the output voltage feedback control loops 604 and 702 of the PFC controllers 234 illustrated in FIGS. 6 and 7 may therefore be slow to moderate. The same slowness however, may make response to loading or input voltage (Vin) changes difficult to rapidly track.

The super regulation of FIG. 7 achieves improvement in response speed. The improved response speed may be achieved even though the added feedback of the measured input current (Iin) should also not be too fast to avoid adding to distortion of the input current (Iin). The ripples of the control correction signals (voltage error correction signal (Verr) and rectified, scaled, measured input current (Kb*Iin)) may be dissimilarly phased. The ripples may be phased such that the net ripple is less than would have been contributed by either control correction signal alone.

In FIG. 2, the output stage power converter 204 may be a circuit or device(s) capable of providing voltage conversion of the boost voltage (Vboost) provided by the input stage power converter 202 and galvanic isolation of the DC output voltage provided by the output stage power converter 204. Alternatively, the output stage power converter 204 may be omitted when the boost voltage (Vboost) is useable directly to power a load. The DC output voltage of the illustrated output stage power converter 204 includes the positive DC output voltage (+Vcc) provided on the positive DC rail 106, and the negative DC output voltage (−Vcc) provided on the negative DC rail 108. The example output stage power converter 204 is a DC-to-DC power converter that includes a first output converter 236, a second output converter 238 and an output filter 240.

The illustrated output stage power converter 204 receives the boost voltage (Vboost) and current from the input stage power converter 202. The first and second output converters 236 and 238 may provide galvanic isolation of the first and second boost converters 230 and 232, respectively. The first and second boost converters 230 and 232 may be galvanically isolated from a ground referenced load, such as an audio amplifier that is sourcing power from the power factor correcting power supply 100. The output filter 240 may be a circuit or device capable of filtering the DC output voltage of the power factor correcting power supply 100 for transients, high frequency noise, etc.

Figure 8:
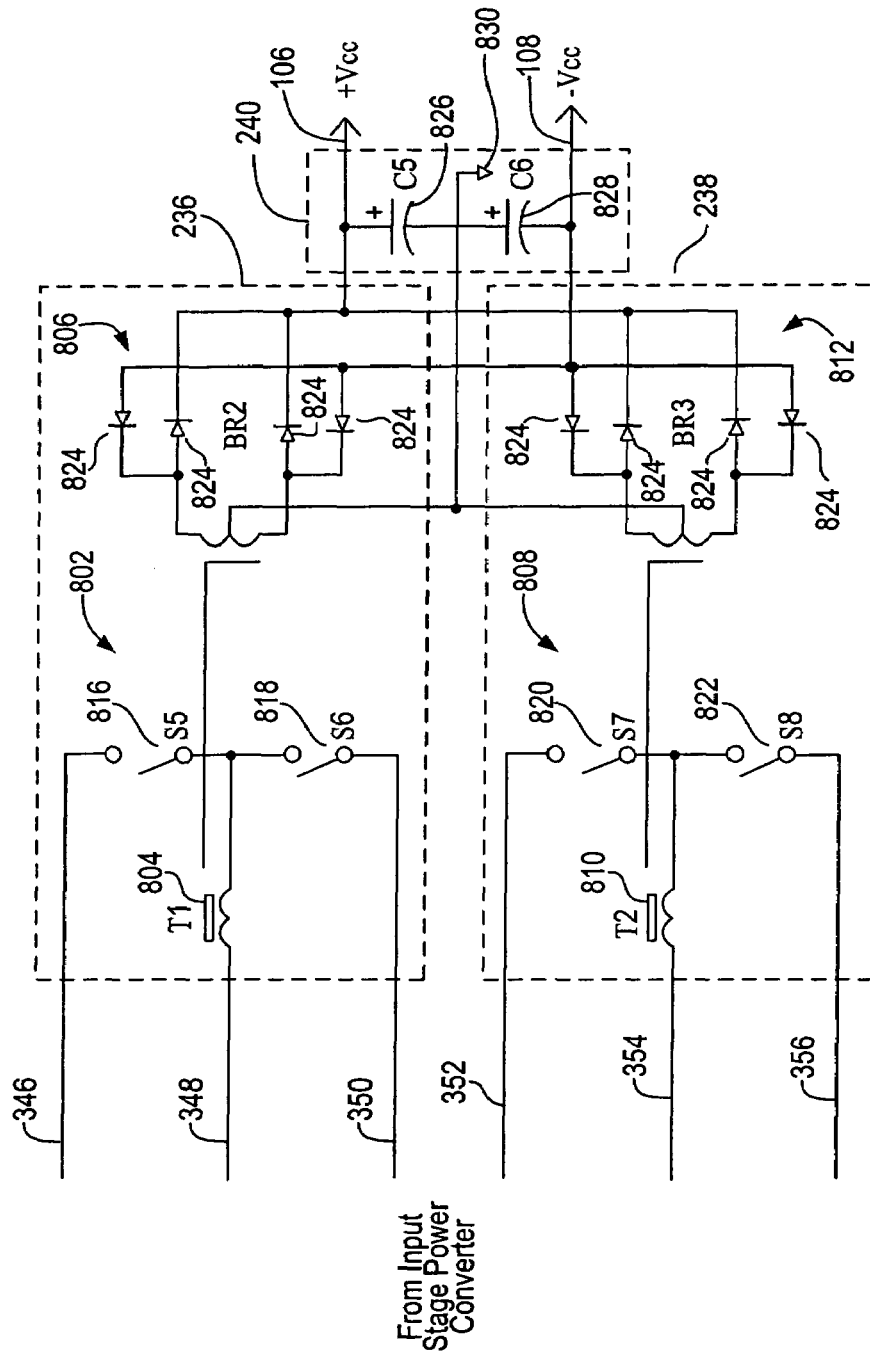
FIG. 8 is a circuit schematic of an output stage power converter included in the power factor correcting power supply illustrated in FIG. 2.

FIG. 8 is an example circuit schematic of the output stage 204 that includes the first and second output converters 236 and 238 and the output filter 240. The first output converter 236 includes a first switch mode converter 802, a first transformer (T1) 804 and a first output bridge rectifier (BR2) 806. The second output converter 236 includes a second switch mode converter 808, a second transformer (T2) 810 and a second output bridge rectifier (BR3) 812. The illustrated first and second switch mode converters 802 and 808 are half-bridge choppers. In other examples, the first and second switch mode converters 802 and 808 may be half bridge series resonant switch mode converters, full bridge series resonant switch mode converters, full-bridge choppers or any other switch mode converter configuration providing similar functionality.

The first switch mode converter 802 includes a first output switch (S5) 816, a second output switch (S6) 818 and the second switch mode converter 808 includes a third output switch (S7) 820 and a fourth output switch (S8) 822. The output switches (S5, S6, S7, S8) 816, 818, 820 and 822 form the active elements of the switch mode converters 802 and 808. The output switches (S5, S6, S7, S8) 816, 818, 820 and 822 may be MOSFETs, IGBTs or any other switching device. The output switches (S5, S6, S7, S8) 816, 818, 820 and 822 may also be designed with a commutation sequence with enough deadtime to allow for zero voltage turn-on with zero voltage switching (ZVS) operation.

The first and second positive boost converter output lines 346 and 350 are electrically coupled with the first output switch (S5) 816 and the second output switch (S6) 818, respectively. As such, charging voltage stored on the first and second boost capacitors (C1, C2) 314 and 316 (FIG. 3) is supplied across the first and second output switches (S5, S6) 816 and 818. The third and fourth output switches (S7, S8) 820 and 822 are electrically coupled with respective first and second negative boost output lines 352 and 356. Charging voltage stored on the third and fourth boost capacitors (C3, C4) 334 and 336 (FIG. 3) is supplied across the third and fourth output switches (S7, S8) 820 and 822. In addition, the first and second transformers (T1, T2) 804 and 810 are electrically coupled with the positive and negative centerpoints 318 and 338, respectively by the respective positive and negative midpoint lines 348 and 354.

The first and second transformers (T1, T2) 804 and 810 may be any voltage transforming device capable of providing galvanic isolation and voltage scaling of signals provided from the first and second switch mode converters 802 and 808. The first and second transformers (T1, T2) 804 and 810 may include enough magnetizing current to freewheel the state of the respective first and second switch mode converters 802 and 808 to zero voltage turn on conditions thereby enabling ZVS operation. The magnetizing current of the first and second transformers (T1, T2) 804 and 810 may be achieved by gapping the core of each of the first and second transformers (T1, T2) 804 and 810. Alternatively, an external inductor may be electrically coupled in shunt with a primary winding of the each of the first and second transformers (T1, T2) 804 and 810.

If MOSFETs are used for the output switches (S5, S6, S7, S8) 816, 818, 820 and 822, a zero voltage state may be accompanied by body diode conduction. In body diode conduction, a small reverse voltage may be formed rather than absolutely zero volts. If, on the other hand, IGBTs are used, the output switches (S5, S6, S7, S8) 816, 818, 820 and 822 may include additional freewheeling diodes in shunt with each of the output switches (S5, S6, S7, S8) 816, 818, 820 and 822.

The use of half-bridge choppers for the first and second switch mode converters 802 and 808 provides voltage balancing of the first and second boost converters 230 and 232 (FIG. 3). At light loads, the input stage power converter 202 has a tendency to produce unequal voltages in the boost capacitors (C1, C2, C3, C4) 314, 316, 334 and 336. Accordingly, additional stress on the boost converter 230 or 232 with the higher voltage is avoided. In addition, incomplete ripple cancellation by the first and second boost converters 230 and 232 is avoided.

Voltage balancing of the first and second boost converters 230 and 232 (FIG. 2) is achieved by maintaining about a 50% duty cycle on each of the output switches switch (S5, S6, S7, S8) 816, 818, 820 and 822. As a result the magnitude of the voltage at the positive and negative centerpoints 318 and 338 may be forced to balance. Should the voltage at the positive and negative centerpoints 318 and 338 deviate from balance, a correcting current may flow through a magnetizing inductance of the associated transformer (T1, T2) 804 or 810 to correct the deviation. The first and second output converters 236 and 238 may act as charge balancers to the first and second boost converters 230 and 232. (FIG. 3) Gapping may avoid saturation of the cores of the first and second transformers (T1, T2) 804 and 810 by DC balancing currents resulting from the flow of correcting current when imbalances occur.

The total voltage supplied to each of the first and second output converters 236 and 238 from the respective first and second boost converters 230 and 232 (FIG. 3) may also remain substantially balanced. The total voltage may be substantially balanced due to the output bridge rectifiers (BR2, BR3) 806 and 812. The output bridge rectifiers (BR2, BR3) 806 and 812 include a plurality of diodes 824 configured to form a full-bridge rectifier.

The non-linear loading characteristics of the output bridge rectifiers (BR2, BR3) 806 and 812 may maintain the substantially balanced condition. If one of the first and second boost converters 230 and 232 develops more boost voltage (Vboost) than the other, that boost converter may be supporting the entire load. The intrinsic impedance of the boost converter 236 or 232 with the higher boost voltage (Vboost) and the impedance of the respective output converter 236 or 238 may act to balance the power being processed by the first and second boost converters 230 and 232. Since the first and second boost converters 230 and 232 are in series, the input current (Iin) must remain about equal.

The first and second output converters 236 and 238 may optimally operate with fixed frequency in an interleaved manner. In addition, the first and second output converters 236 and 238 may operate in quadrature. Interleaving may reduce the magnitude of RMS charging current supplied to the output filter 240. In addition, interleaving may double the ripple frequency seen on the positive DC rail 106 and the negative DC rail 108. The output bridge rectifiers (BR2, BR3) 806 and 812 may double the ripple frequency. The use of series interleave doubles the ripple frequency again. Thus the ripple frequency is increased by a factor of four over the switching frequency of the first and second switch mode converters 802 and 808.

The output filter 240 includes a first secondary capacitor (C5) 826 and a second secondary capacitor (C6) 828 for final filtering of the DC output power of the power factor correcting power supply 100. The DC output power includes the positive DC output voltage (+Vcc) provided on the positive DC rail 106 and the negative DC output voltage (−Vcc) provided on the negative DC rail 108. The first secondary capacitor (C5) 826 is electrically coupled between the positive DC rail 106 and a ground connection 830. The second secondary capacitor (C6) 828 is coupled between the negative DC rail 108 and the ground connection 830.

The output switches (S5, S6, S7, S8) 816, 818, 820 and 822 may be directed by an output stage switch mode controller (not shown) to operate with series resonant discontinuous switching mode (DCM) control to convert the boost voltage (Vboost) to the first and second DC output voltages (+Vcc, −Vcc). The output stage power converter 204 may be unregulated to allow the output switches (S5, S6, S7, S8) 816, 818, 820 and 822 to remain in the discontinuous mode of operation where the switches turn off at zero current. By managing the deadtime, the switches can also be turned on at zero voltage. This is known as zero voltage switching (ZVS) and may be used to minimize switching losses in the output switches (S5, S6, S7, S8) 816, 818, 820 and 822.

Control of the input stage power converter 202 on the other hand, is with the PFC controller 234 (FIG. 3) and includes voltage regulation as previously discussed. Thus, voltage regulation of the output stage power converter 204 is unnecessary. During startup, the output stage power converter 204 can also start operation immediately and charge the first and second secondary capacitors (C5, C6) 826 and 828 without requiring a separate soft-start mode of control.

The operating frequency of the output stage power converter 204 may be fixed. The output stage power converter 204 is inserted between the input stage power converter 202 (FIG. 2) and a load, such as an audio amplifier 102 (FIG. 1). In this configuration, the output stage power converter 204 may be adequate to filter and decouple the switching noise of variable frequency operation of the input stage power converter 202 from the switch-mode operation of the load. When the power factor correcting power supply 100 (FIG. 1) is supplying an audio amplifier 102 (FIG. 1), the frequency of the output stage power converter 204 may be synchronized to the fixed frequency of operation of the switch-mode audio amplifier 102 to avoid beat tones in the amplified audio output signal of the audio amplifier 102.

In FIG. 2, due to the filtering provided by the output filter 240, the PFC controller 234 may direct the operation of the first and second boost converters 230 and 232 to operate with FM (frequency modulation). Since the input stage power converter 202 is not resonant, substantial FM is possible. The use of FM of the input stage power converter 202 can improve electromagnetic magnetic interference (EMI) control and therefore further reduce the cost, size and weight of the line filter 220 that may be used to remove line conducted switching noise. The practice of FM may also be aided by higher switching frequencies since a modulation index to achieve significant spreading of the noise spectrum may be reduced. To minimize EMI, the spectrum may be spread over a bandwidth that is greater than a typical communication channel, and wider than the bandwidth of a regulatory spectrum analyzer, such as 9 KHz.

The PFC controller 234 and the output stage switch mode controller may also galvanically isolate the respective gate drivers of the switches. Accordingly, the PFC controller 234 and the output stage switch mode controller may be ground referenced to ground 830 (FIG. 8) at the secondary side of the output stage power converter 204. The DC output voltage (first and second DC output voltages (+Vcc, −Vcc)) is useable directly as a regulated variable. If the PFC controller 234 is on the ground-referenced side of the input and output stage power converters 202 and 204, then the signals provided on the input voltage sensing line 364 (FIG. 3) and the input current sensing line 370 (FIG. 3) may also be galvanically isolated. The sensing of the boost voltage (Vboost) to provide feedforward gain control of the PWM modulator included in the PFC controller 234 may also be galvanically isolated.

The output stage switch mode controller may also be powered from the negative second boost converter output line 356 (FIG. 3). This may allow the output stage power converter 204 to be started without the use of a separately controlled power supply to apply initial power to both the PFC controller 234 and the output stage switch mode controller.

Figure 9:
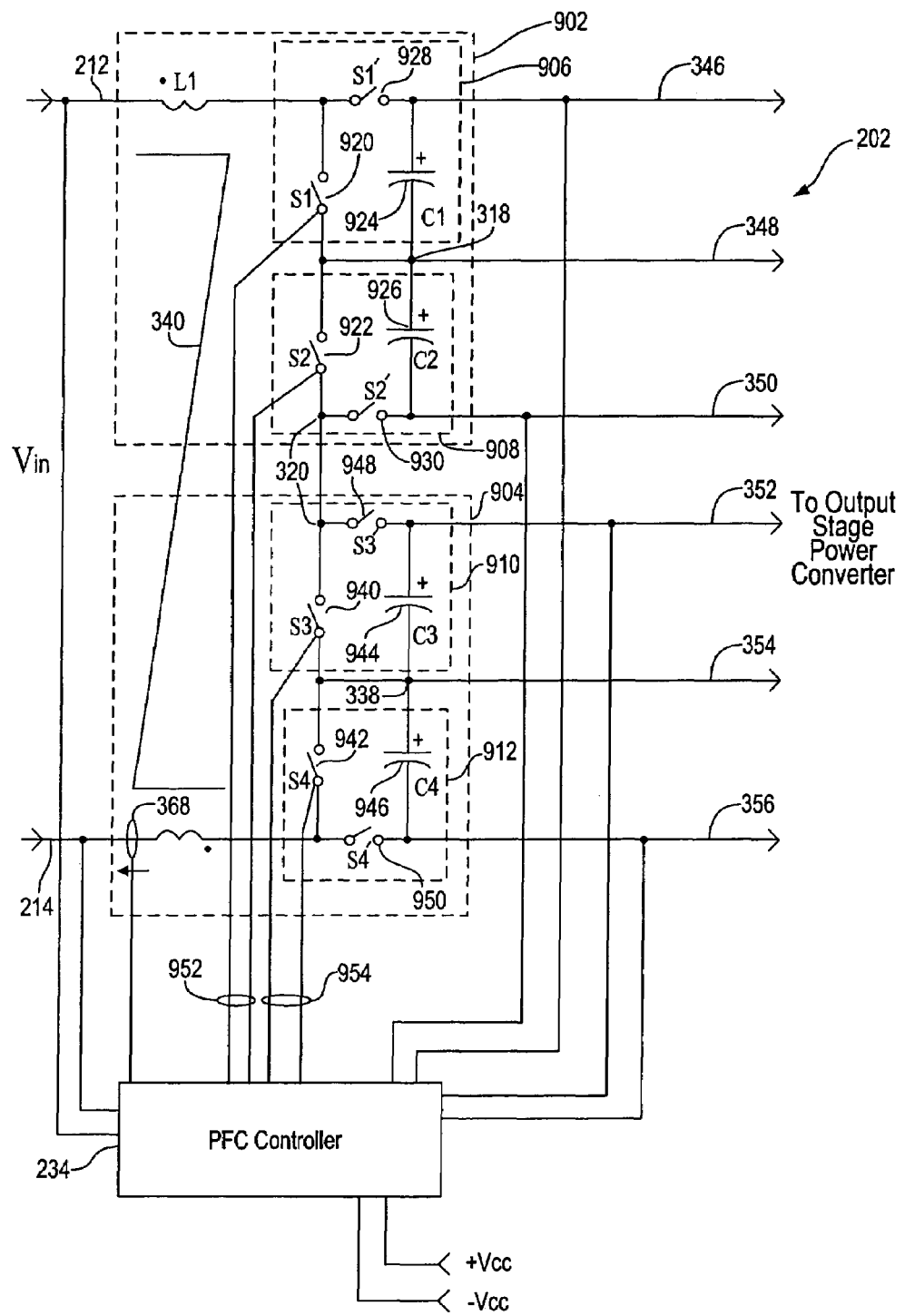
FIG. 9 is another circuit schematic of an input stage power converter included in the power factor correcting power supply illustrated in FIG. 2.

FIG. 9 illustrates a circuit schematic of another example of the input stage power converter 202. Similar to FIG. 3, the input stage power converter 202 may operate as an AC to DC boost converter using a first boost converter 902 and a second boost converter 904 that are electrically coupled in series. In addition, the input stage power converter 204 is supplied input voltage (Vin) on the feeder line 212 and the common line 214. In other examples, additional boost converters may be included in the input stage power converter 202.

The first boost converter 902 includes a first boost sub-circuit 906 electrically coupled in series with a second boost sub-circuit 908. The second boost converter 904 includes a third boost sub-circuit 910 and a fourth boost sub-circuit 912 electrically coupled in series. Each of the first and second boost converters 902 and 904 operate similarly to the first and second boost converters 230 and 232 described with reference to FIG. 3.

The first and second boost sub-circuits 906 and 908 each include respective first and second boost switches (S1, S2) 920 and 922 and respective first and second boost capacitors (C1, C2) 924 and 926. In addition, each of the first and second boost sub-circuits 906 and 908 include respective first and second boost sub-switches (S1', S2') 928 and 930. The third and fourth boost sub-circuits 910 and 912 each include respective third and fourth boost switches (S3, S4) 940 and 942 and first and second capacitors (C1, C2) 944 and 946. The third and fourth boost sub-circuits 910 and 912 further include respective third and fourth boost sub-switches (S3', S4') 948 and 950.

The input stage power converter 202 also includes the inductor 340, the positive centerpoint 318, the centerpoint 320 and the negative centerpoint 338 similar to FIG. 3. In addition, the charge voltage on the first and second boost capacitors (C1, C2) 924 and 926 may be supplied to the output stage power converter 204 on the first positive boost converter output line 346, the positive midpoint line 348 and the second positive boost converter output line 350. The charge voltage on the third and fourth boost capacitors (C3, C4) 944 and 946 may be supplied on the first negative boost converter output line 352, the negative midpoint line 354 and the second negative boost converter output line 356 similar to FIG. 3.

The boost sub-switches (S1', S2', S3', S4') 928, 930, 948 and 950 replace the boost diodes (D1, D2, D3, D4) 310, 312, 330 and 332 of FIG. 3. The boost sub-switches (S1', S2', S3', S4') 928, 930, 948 and 950 may be driven in time alternation with the respective boost switches (S1, S2, S3, S4) 920, 922, 940 and 942. The time alternation provides lower conduction losses in the freewheeling function than was previously experienced with the boost diodes (D1, D2, D3, D4) 310, 312, 330 and 332. In addition, the boost sub-switches (S1', S2', S3', S4') 928, 930, 948 and 950 and the respective boost switches (S1, S2, S3, S4) 920, 922, 940 and 942 may be operated with deadtime to avoid shoot through currents. Further, the first, second, third and fourth boost sub-switches (S1', S2', S3', S4') 928, 930, 948 and 950 may be driven in time alteration with the respective first, second, third and fourth boost switches (S1, S2, S3, S4) 920, 922, 940 and 942. The time alternation allows bilateral energy flow in the input stage 202 (FIG. 2) of the power factor correcting power supply 100 (FIG. 1).

Bilateral energy flow allows the power factor correcting power supply 100 to supply power to the power source 112 (FIG. 1) or consume power from the power source 112. In addition, discontinuous current mode (DCM) operation of the boost sub-circuits 906, 908, 910 and 912 may be eliminated due to the boost sub-switches (S1', S2', S3', S4') 928, 930, 948 and 950. Bilateral energy flow and non-DCM operation is controlled by the PFC controller 234 included in the input stage power converter 204.

Control of the duty cycle of the first and second boost switches (S1, S2) 920 and 922 and the first and second boost sub-switches (S1', S2') 928 and 930 may be with switching signals provided from the PFC controller 234 on positive switch control lines 952. The duty cycles of the second and third boost switches (S3, S4) 940 and 942 and the third and fourth boost sub-switches (S3', S4') 948 and 950 may be controlled with switching signals from the PFC controller 234 on negative switch control lines 954. The input voltage (Vin), the input current (Iin) and the boost voltage (Vboost) may be provided to the PFC controller 234 similar to FIG. 3.

The PFC controller 234 is similar to the PFC controller 234 discussed with reference to FIGS. 3, 5, 6 and 7. As previously discussed with reference to FIGS. 6 and 7, the PFC controller 234 may operate with an overall voltage gain that is less than unity. Alternatively, the PFC controller 234 may operate with an overall voltage gain of less than or greater than unity due to the bilateral energy flow capability of the power factor correcting power supply 100. When the overall voltage gain is greater than unity, the power factor correcting power supply 100 (FIG. 1) is supplying power to the power source 112 (FIG. 1). Conversely, when the overall voltage gain is less than unity, the power factor correcting power supply 100 is consuming power from the power source 112. As further discussed with reference to FIGS. 6 and 7, the multiplier 612 may be configured for operation with a four quadrant working range to adjust the overall voltage gain both above and below unity.

When the overall voltage gain is adjusted above unity by the PFC controller 234, energy is returned from the boost capacitors (C1, C2, C3, C4) 924, 926, 944 and 946 to the power source 112 (FIG. 1). Voltage and current stored in the boost capacitors (C1, C2, C3, C4) 924, 926, 944 and 946 may flow to the power source 112 through the boost sub-switches (S1', S2', S3', S4') 928, 930, 948 and 950. Such energy flow may occur when the boost capacitors (C1, C2, C3, C4) 924, 926, 944 and 946 have stored excess energy as previously discussed.

The use of the full wave bridge rectifier (BR1) 200 (FIG. 2) prevents substantial energy flow to the power source 112 (FIG. 2). To permit substantial energy return to the power source 112, full wave bridge rectifier (BR1) 200 may be implemented as a synchronous rectifier. The synchronous rectifier may be implemented with MOSFETs or other switches that provide bi-directional energy flow.

The PFC controller 234 may control the boost sub-circuits 906, 908, 910 and 912 with interleave of four operation to minimize ripple current. In addition, the boost sub-circuits 906, 908, 910 and 912 may be controlled with FM to improve EMI as in the example of FIG. 3. Operation of the boost switches (S1, S2, S3, S4) 920, 922, 940 and 942 is illustrated by the respective modulation waveforms 402, 404, 406 and 408 depicted in the timing diagram and modulation phasing diagram 410 of FIG. 4.

Figure 10:
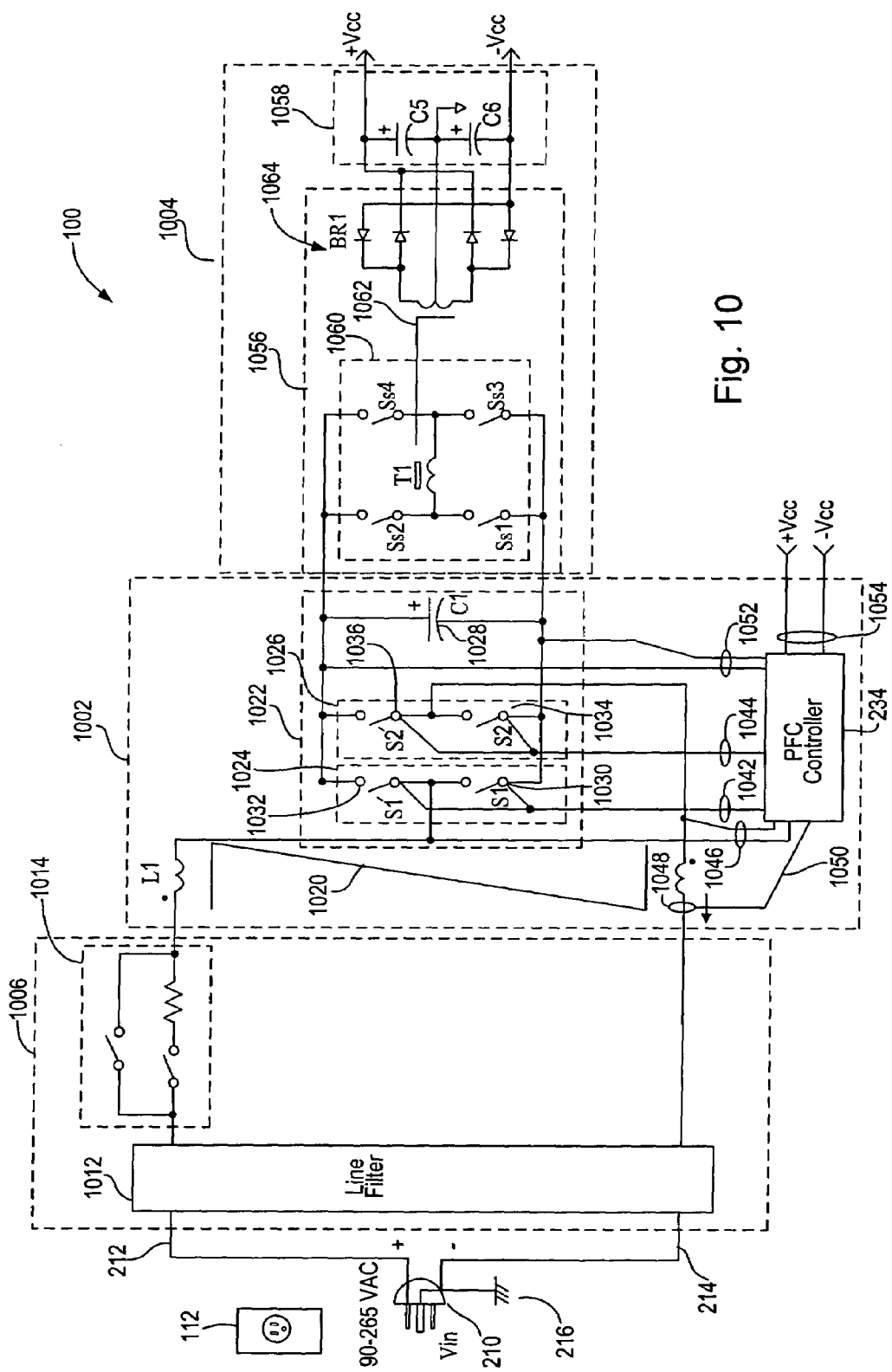
FIG. 10 is a circuit schematic of the power factor correcting power supply illustrated in FIG. 1.

FIG. 10 illustrates a circuit schematic of another example of the power factor correcting power supply 100. Similar to FIG. 2, the power factor correcting power supply 100 may include a pre-stage 1006. In addition, the power factor correcting power supply 100 includes an input stage power converter 1002 and an output stage power converter 1004. The illustrated power factor correcting power supply 100, however, does not include a bridge rectifier as in FIG. 2. A bridge rectifier is unnecessary due to the configuration of the input stage power converter 1004. The input stage power converter 1004 is subject to the unrectified AC input voltage (Vin). In addition, power may now be returned to the power source 112 (FIG. 1) since there is no bridge rectifier to block reverse flows of energy.

The power source 112 may supply single phase power in the range of about 90 VAC to about 265 VAC to the power factor correcting power supply 100. Power may be supplied by the power plug 210 that includes the feeder line 212, the common line 214 and the ground 216. In other examples, other voltage ranges, numbers of phases and interconnections to the power source 112 are possible.

Like FIG. 2, the pre-stage 1006 may or may not include a line filter 1012 for filtering EMI and a softstart circuit 1014 for startup current and fault current control. The input stage power converter 1004 illustrated in FIG. 10 includes the PFC controller 234, a boost inductor 1020 and a boost converter that is an interleaved full bridge converter 1022. The boost inductor 1020 may be multiple inductors, a single winding or a two segment winding as shown. In other examples, additional boost converters may be included in the input stage power converter 202.

The interleaved full bridge converter 1022 includes a first boost sub-circuit 1024 and a second boost sub-circuit 1026 and a boost capacitor 1028. The first boost sub-circuit 1024 includes a first boost switch (S1) 1030 and a first boost sub-switch (S1') 1032. The second boost sub-circuit 1026 includes a second boost switch (S2) 1034 and a second boost sub-switch (S2') 1036. The first and second boost sub-circuits 1024 and 1026 share the boost capacitor 1028 and therefore the same magnitudes of voltage. Each of the first and second boost sub-circuits 1024 and 1026 are coupled in series and may each be referred to as a half bridge. The first boost switch (S1) 1030 and the second boost switch (S2) 1034 are electrically coupled in series and in parallel with the input voltage (Vin). Accordingly, from the perspective of interleaved operation, the interleaved full bridge converter 1022 operates with series interleave as in the previous examples.

During operation, when both the first and second boost switches (S1, S2) 1030 and 1034 are closed, the boost inductor 1020 may be magnetized with the input voltage (Vin) and input current (Iin). When the first boost switch (S1) 1030 is closed and the second boost switch (S2) 1034 is open, the second boost sub-switch (S2') 1036 may be closed to demagnetize the boost inductor 1020 and charge the boost capacitor (C1) 1028. Conversely, closing the second boost switch (S2) 1034 and the first boost sub-switch (S1') 1032 demagnetizes the boost inductor 1020 to charge the boost capacitor (C1) 1028 to the boost voltage (Vboost).

The boost capacitor (C1) 1028 may be charged to the boost voltage (Vboost) by high frequency series interleaved operation of the boost switches (S1, S2) 1030 and 1034 and the boost sub-switches (S1', S2') 1032 and 1036. The operating voltages on the boost sub-circuits 1024 and 1026 and the boost capacitor (C1) 1028 may be about the magnitude of the boost voltage (Vboost). For example, with an input voltage (Vin) of about 265 VAC and a boost voltage of about 380 VDC to about 400 VDC, the operating voltages are about 380 V. The power factor correcting power supply 100 illustrated in FIG. 10 is also capable of bilateral energy flow as discussed with reference to FIGS. 6 and 8.

Similar to the previous examples, the PFC controller 234 may control the duty cycle of the boost switches (S1, S2) 1030 and 1034 and the boost sub-switches (S1', S2') 1032 and 1036. Control signals may be provided by the PFC controller 234 to the first boost switch (S1) 1030 and the first boost sub-switch (S1') 1032 on first boost signal lines 1042. The PFC controller 234 may provide control signals on a second boost signal line 1044 to control the second boost switch (S2) 1034 and the second boost sub-switch (S2') 1036. The boost switches (S1, S2) 1030 and 1034 may be operated with interleave of N, where N equals the number of boost switches. In the illustrated example, N=2. The interleave full-bridge converter 1022 can be controlled by the PFC controller 234 with FM to minimize EMI. The combined effects of ripple reduction and FM may reduce the physical size and cost of the line filter 1012 used to reduce EMI.

Control by the PFC controller 234 is based on measured voltages and currents as previously discussed. In the example of FIG. 10, the input voltage (Vin) is measured with an input voltage line 1046 and the input current (Iin) is measured with a current sensor 1048 and provided on an input current line 1050. The boost voltage (Vboost) is measured across the boost capacitor (C1) 1028 with boost voltage lines 1052. The positive DC rail voltage +Vcc and the negative DC rail voltage -Vcc is measured on DC rail voltage lines 1054. As a function of the various voltages and currents, the PFC controller 234 controls operation of the boost switches (S1, S2) 1030 and 1034.

Figure 11:
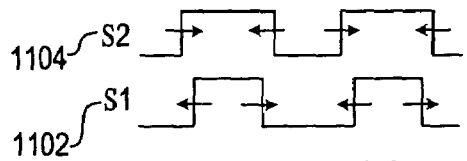
FIG. 11 a timing diagram of an input stage power converter included in the power factor correcting power supply of FIG. 10.
Figure 11:
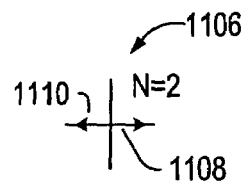

FIG. 11 is a timing diagram illustrating operation of the first and second boost switches (S1, S2) 1030 and 1034 within the interleaved full bridge converter 1022 (FIG. 10). The first and second boost sub-switches (S1', S2') 1032 and 1036 may be operated in time alteration with the respective first and second boost switches (S1, S2) 1030 and 1034. A first modulation waveform 1102 and a second modulation waveform 1104 represent operation of the respective boost switches (S1, S2) 1030 and 1034. Similar to FIG. 4, each of the first and second modulation waveforms 1102 and 1104 are PWM signals. As illustrated by the arrows in the timing diagram, the input voltage (Vin) would be negative and transitioning to a more positive voltage for the timing shown. Also illustrated is a modulation phasing diagram 1106 that includes a first and second modulation vector 1108 and 1110 evenly spaced at about 180 degrees. As in the modulation phasing diagram of FIG. 4, each of the modulation vectors 1108 and 1110 represent a respective one of the modulation waveforms 1102 and 1104 operating with interleave of two (N=2).

In FIG. 10, the output stage power converter 1004 includes an output converter 1056 and an output filter 1058. The output converter 1056 includes a switch mode converter 1060, a transformer (T1) 1062 and a bridge rectifier (BR1) 1064. The output filter 1058, the transformer (T1) 1062 and the bridge rectifier (BR1) 1064 are similar to the output filter 240, the transformer (T1) 804 and the bridge rectifier (BR2) 806 previously discussed with reference to FIG. 8. The switch mode converter 1060 is illustrated as a full bridge non-resonant switch mode converter (full bridge chopper). In other examples, the switch mode converter 1060 may be a series resonant full bridge switch mode converter or any other switch mode converter with similar functionality. The switch mode converter 1060 may be controlled with an output stage switch mode controller (not shown). The output stage switch mode controller may operate the switch mode converter 1060 with fixed frequency. In addition, when the power factor correcting power supply 100 supplies power to an audio amplifier or other switching load, the switch mode converter 1060 may be synchronized to the operation of the switching load.

Figure 12:
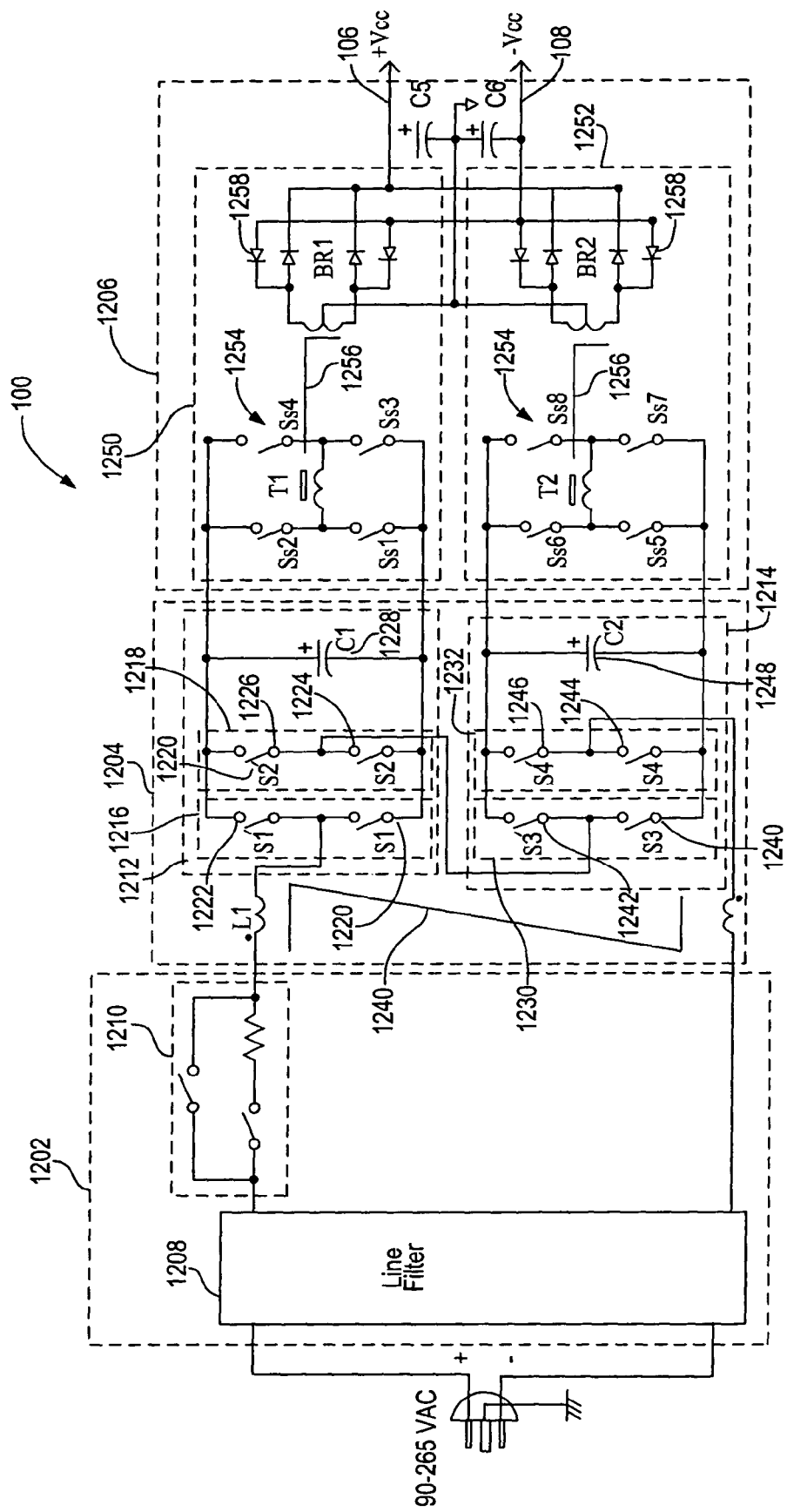
FIG. 12 is another circuit schematic of the power factor correcting power supply illustrated in FIG. 1.

FIG. 12 is yet another example power factor correcting power supply 100 similar to FIG. 10 that may include a pre-stage 1202. The pre-stage 1202 may include a line filter 1208 to filter EMI and a soft start circuit 1210 to manage inrush and fault currents. In addition, the power factor correcting power supply 100 includes an input stage power converter 1204 and an output stage power converter 1206. Similar to FIG. 10, the power factor correcting power supply 100 does not include a bridge rectifier and the input stage power converter 1204 is subject to unrectified AC input voltage (Vin). For purposes of brevity, only differences with FIG. 10 will be further discussed in detail.

In FIG. 12, the input stage power converter 1204 includes a first (positive) boost converter that is a first interleaved full bridge converter 1212 and a second (negative) boost converter that is a second interleaved full bridge converter 1214 electrically coupled in series. The first interleaved full bridge converter 1212 includes a first boost sub-circuit 1216 and a second boost sub-circuit 1218 that are electrically coupled in series. The first boost sub-circuit 1216 includes a first boost switch (S1) 1220 and a first boost sub-switch (S1') 1222. The second boost sub-circuit 1218 includes a second boost switch (S2) 1224 and a second boost sub-switch (S2') 1226. The first and second boost sub-circuits 1216 and 1218 may be configured as respective first and second half bridges. The first boost switch (S1) 1220 and the second boost switch (S2) 1224 are electrically coupled in series with each other and in parallel with the input voltage (Vin). The first interleaved full bridge converter 1212 also includes a first boost capacitor (C1) 1228 that is shared by the first and second boost sub-circuits 1216 and 1218.

The second interleaved full bridge converter 1214 includes a third boost sub-circuit 1230 and a fourth boost sub-circuit 1232. The third boost sub-circuit 1230 includes a third boost switch (S3) 1240 and a third boost sub-switch (S3') 1242. The fourth boost sub-circuit 1232 includes a fourth boost switch (S4) 1244 and a fourth boost sub-switch (S4') 1246. The third and fourth boost sub-circuits 1230 and 1232 may be configured in series as respective third and fourth half bridges. The second interleaved full bridge converter 1214 also includes a second boost capacitor (C2) 1248 shared by the third and fourth boost sub-circuits 1230 and 1232.

The input stage power converter 1204 also includes a boost inductor (L1) 1240. The example boost inductor (L1) 1240 is illustrated with two sections to reduce common mode noise. In other examples, the boost inductor (L1) may be one section, two separate boost inductors, or any other configuration performing a similar function. An inductor segment may also be coupled between the first and second interleaved full bridge converters 1212 and 1214.

The first and second interleaved full bridge converters 1212 and 1214 may each be operated with series interleave of two. In addition, the first and second interleaved full bridge converters 1212 and 1214 may be series interleaved resulting in interleave of four (N=4). The boost switches (S1, S2, S3, S4) 1220, 1224, 1240 and 1244 are electrically coupled in series with each other and in parallel with the input voltage (Vin). As such, the boost switches (S1, S2, S3, S4) 1220, 1224, 1240 and 1244 operate with series interleave as in the previous examples.

A PFC controller (not shown) may control the duty cycle of the boost switches (S1, S2, S3, S4) 1220, 1224, 1240 and 1244 and the boost sub-switches (S 1', S2', S3', S4') 1222, 1226, 1242 and 1246 with natural double-edge PWM. The boost switches (S1, S2, S3, S4) 1220, 1224, 1240 and 1244 and respective boost sub-switches (S1', S2', S3', S4') 1222, 1226, 1242 and 1246 may be operated in time alternation. In addition, the boost switches (S1, S2, S3, S4) 1220, 1224, 1240 and 1244 and the boost sub-switches (S1', S2', S3', S4') 1222, 1226, 1242 and 1246 may be operated with FM to improve EMI and reduce the physical size of the line filter as previously discussed.

The power factor correcting power supply 100 of FIG. 12 operates with an interleave number of four (N=4). Since the first and second interleaved full bridge converters 1212 and 1214 are in series, each of the first and second interleaved full bridge converters 1212 and 1214 provide about half of the total boost voltage (Vboost). For example, where the desired total boost voltage (Vboost) is about 380 VDC to about 400 VDC, each of the first and second interleaved full bridge converters 1212 and 1214 may operate with about 190 VDC to about 200 VDC of operating voltage on the first and second boost capacitors (C1, C2) 1228 and 1248, respectively. Accordingly, the PWM voltage (Vc) of each of the first and second full bridge converters 1214 and 1216 may also be reduced by a factor of two.

Due to the interleave number of four, the input ripple current amplitude is reduced by a factor of 16 compared to a non-interleaved boost converter PFC. In addition, the ripple frequency is increased four fold. Further, modulation vectors are spaced at about 90 degree intervals around the four quadrants. In practice, the lower operating voltage allows for higher switching frequency of the boost switches (S1, S2, S3, S4) 1220, 1224, 1240 and 1244. The higher switching frequency allows the net inductor volume and physical size to be reduced well below that required in a standard non-interleaved PFC boost converter.

Figure 13:
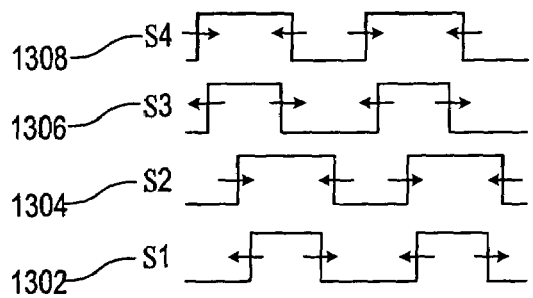
FIG. 13 is a timing diagram of an input stage power converter included in the power factor correcting power supply of FIG. 12.
Figure 13:
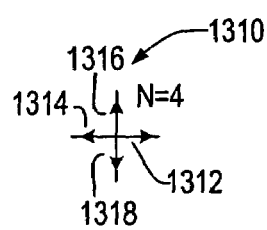

FIG. 13 is a timing diagram for the power factor correcting power supply 100 illustrated in FIG. 12. The timing waveforms are PWM waveforms driving each of the boost switches (S1, S2, S3, S4) 1220, 1224, 1240 and 1244. First and second modulation waveforms 1302 and 1304 represent operation of the respective first and second boost switches (S1, S2) 1220 and 1224 of the first interleaved full bridge converter 1212. Third and fourth modulation waveforms 1306 and 1308 represent operation of the respective boost switches (S3, S4) 1240 and 1244 of the second interleaved full bridge converter 1214

The timing waveforms represent a positive input voltage (Vin) that is going more negative as indicated by the arrows on the waveforms. The first and second interleaved full bridge converters 1212 and 1214 are modulated in quadrature. Also illustrated is a modulation phasing diagram 1310 that includes four modulation vectors 1312, 1314, 1316 and 1318 (N=4) representing each of the respective modulation waveforms 1302, 1304, 1306 and 1308. The modulation vectors are evenly spaced about 90 degrees apart around the modulation phasing diagram 1310.

In FIG. 12, the output stage power converter 1206 includes a first output converter 1250 and a second output converter 1252. Similar to FIG. 10, the example first and second output converters 1250 and 1252 each include a full bridge non-resonant switch mode converter 1254 (choppers), a transformer 1256 and a bridge rectifier 1258. In other examples, the first and second output converters 1250 and 1252 may each include series resonant or any other switch mode converter configuration with similar functionality. The first and second output converters 1250 and 1252 may be controlled with an output stage switch mode controller (not shown). The output stage switch mode controller may direct the first and second output converters 1250 and 1252 to operate with fixed frequency and interleave. Interleave operation of N=2 may double the ripple frequency on the positive DC rail 106 and the negative DC rail 108. In addition, ripple currents in the capacitors (C5, C6) of the output converters 1250 and 1252 are reduced.

The series configuration of the first and second interleaved full bridge converters 1212 and 1214 may provide self-stabilization. When the voltage across the first boost capacitor (C1) 1228 and the second boost capacitor (C2) 1248 are substantially in equilibrium, about the same discharging current flows through each of the first output converter 1250 and the second output converter 1252. By virtue of being connected in the same current path, the first and second interleaved full bridge converters 1212 and 1214 process substantially identical current. When the voltages are not about equal, the full bridge output converter 1250 or 1252 with the greater stored voltage on the boost capacitor (C1, C2) 1228 or 1248 will discharge the respective stored voltage until the charging voltages substantially reach equilibrium on the boost capacitors (C1, C2) 1228 and 1248. Once the voltages on the boost capacitors (C1, C2) 1228 and 1248 are about equal, and the output converters 1250 and 1252 share power and therefore share current about equally. Both the output converters 1250 and 1252 supply DC output voltage to the same positive DC rail 106 and negative DC rail 108. As such, the output converters 1250 and 1252 may also share power by operating at about the same voltages.

Figure 14:
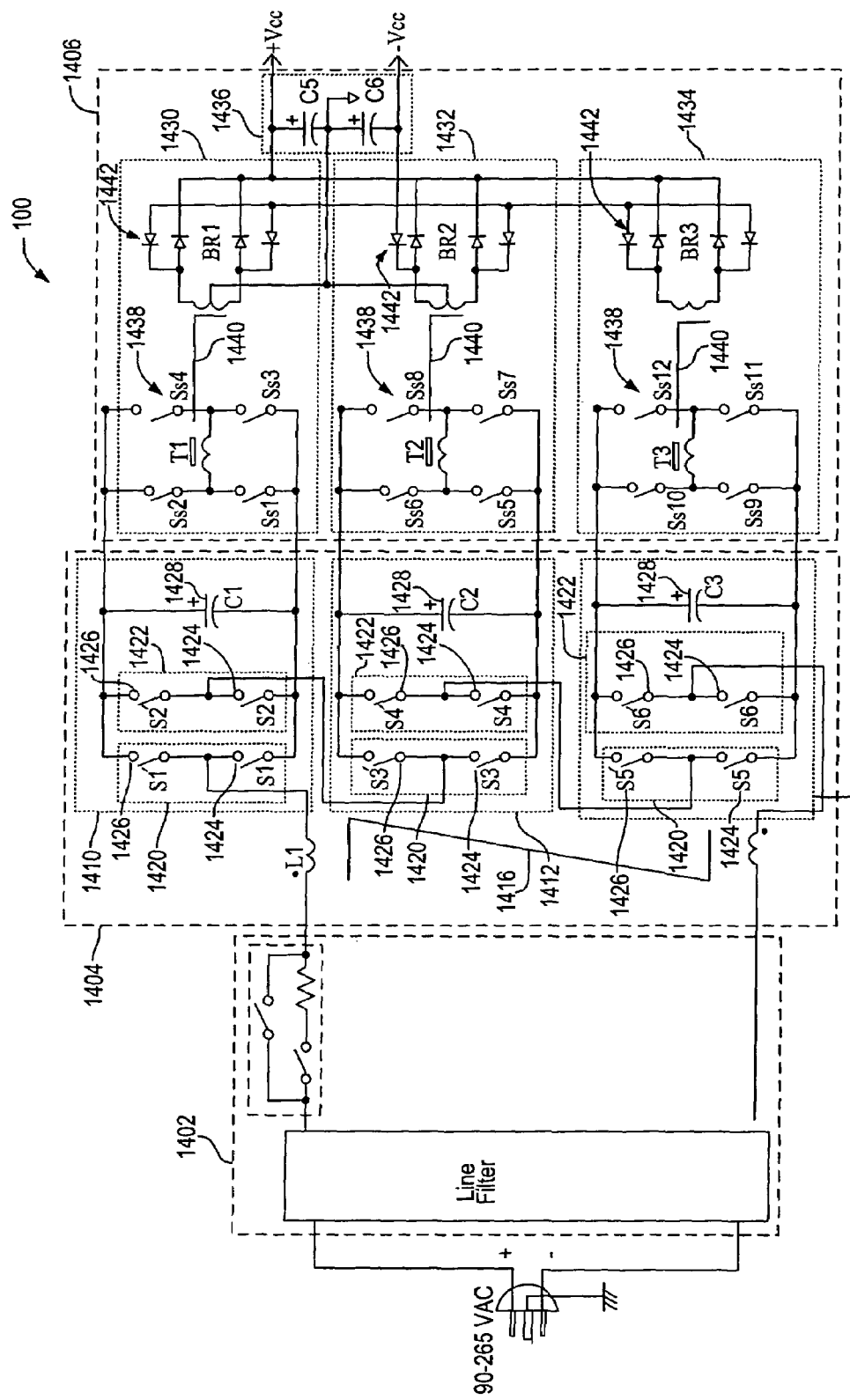
FIG. 14 is another circuit schematic of the power factor correcting power supply illustrated in FIG. 1.

FIG. 14 is still another example of a power factor correcting power supply 100 that is similar to FIGS. 10 and 12. The power factor correcting power supply 100 may include a pre-stage 1402. In addition, the power factor correcting power supply 100 includes an input stage power converter 1404 and an output stage power converter 1406. A bridge rectifier is not included prior to the input stage power converter 1404. For purposes of brevity, differences with FIGS. 10 and 12 will mainly be discussed.

The input stage power converter 1404 includes a first boost converter that is a first interleaved full bridge converter 1410, a second boost converter that is a second interleaved full bridge converter 1412 and a third boost converter that is a third interleaved full bridge converter 1414 electrically coupled in series. In addition, the input stage power converter 1404 includes a boost inductor 1416 that is similar to the boost inductor (L1) 340 previously discussed with reference to FIG. 3. In other examples, additional boost converters may be included in the input stage power converter 1404.

Each of the interleaved full bridge converters 1410, 1412 and 1414 includes a first boost sub-circuit 1420 and a second boost sub-circuit 1422 electrically coupled in series. The boost sub-circuits each include a boost switch (S1, S2, S3, S4, S5, S6) 1424 and a boost sub-switch (S1', S2', S3', S4', S5', S6') 1426. Each of the first and second boost sub-switches 1416 and 1418 share a boost capacitor (C1, C2, C3) 1428. Similar to the previous examples, the boost switches (S1, S2, S3, S4, S5, S6) 1424 are electrically coupled in series with each other and in parallel with input voltage (Vin). The boost switches (S1, S2, S3, S4, S5, S6) 1424 may therefore be operated with series interleave.

The input stage power converter 1404 may operate with interleave of six due to the six boost switches 1424. The input ripple current may be reduced by a factor of 36. The reduced ripple current may result in reduction of the physical size of the boost inductor 1416 and minimization of a line filter included in the pre-stage 1402.

The input voltage (Vin) and the boost voltage (Vboost) may be divided among the interleaved full bridge converters 1410, 1412 and 1414. If, for example, the input voltage (Vin) was about 265 Vrms, and the boost voltage (Vboost) was about 380 VDC to about 400 VDC, each of the interleaved full bridge converters 1410, 1412 and 1414 may process about 127V, and the boost capacitors (C1, C2, C3) 1428 may store about 126 VDC to about 134 VDC. Accordingly, the boost switches 1424 may be a switch design with a lower voltage rating, such as high performance trench MOSFETs. In addition, lower voltage rated switches may be used for the boost sub-switches (S1', S2', S3', S4', S5', S6') 1426 and in the output stage power converter 1406.

The interleaved full bridge converters 1410, 1412 and 1414 may be controlled by a PFC controller as previously discussed. The PFC controller (not shown) may generate three separate PWM modulating triangle waveforms to control the respective interleaved full bridge converters 1410, 1412 and 1414. The PWM modulating triangle waveforms may be used as natural double-edged PWM waveforms. The switching frequency of the boost switches 1424 may be controlled by the PFC controller with FM to spread the EMI spectrum. As a result, filtering with the line filter included in the pre-stage 1402 may be reduced.

Figure 15:
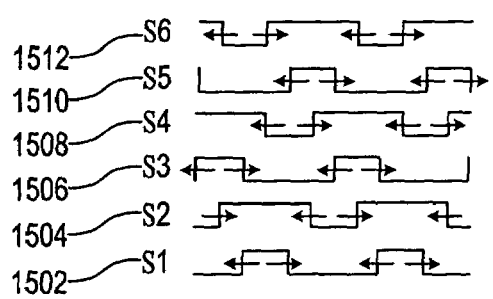
FIG. 15 is a timing diagram of an input stage power converter included in the power factor correcting power supply illustrated in FIG. 14.
Figure 15:
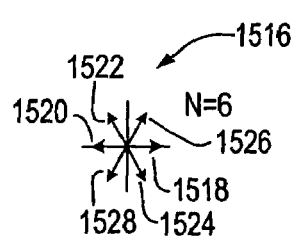

FIG. 15 is a timing diagram illustrating operation of the boost switches (S1, S2, S3, S4, S5, S6) 1424 (FIG. 14) for each of the interleaved full bridge converters 1410, 1412 and 1414 operating with an interleave of six since N=6. A first modulation waveform 1502 represents operation of a first boost switch (S1) 1424, and a second modulation waveform 1504 representing operation of a second boost switch (S2) 1424 in the first interleaved full bridge converter 1410. Representing operation of a third boost switch (S3) 1424 and a fourth boost switch (S4) 1424 in the second interleaved full bridge converter 1412 are a third modulation waveform 1506 and a fourth modulation waveform 1508, respectively. A fifth modulation waveform 1510 represents operation of a fifth boost switch (S5) 1424 and a sixth modulation waveform 1512 representing operation of a sixth boost switch (S6) 1424 in the third interleaved full bridge converter 1414. Similar to previous examples, the boost sub-switches (S1', S2', S3', S4', S5', S6') 1426 may be operated in time alteration with the respective boost switches (S1, S2, S3, S4, S5, S6) 1424.

In the example modulation waveforms illustrated, the input voltage (Vin) from the power source 112 (FIG. 1) would be positive and decreasing towards zero to have the duty and duty trends shown by the arrows on the first, second, third, fourth, fifth and sixth modulation waveforms 1502, 1504, 1506, 1508, 1510 and 1512.

Also illustrated in FIG. 15 is a modulation phasing diagram 1516. The modulation phasing diagram 1516 illustrates the phasing of a plurality of vectors 1518, 1520, 1522, 1524, 1526 and 1528 representing modulation of the respective modulation waveforms 1502, 1504, 1506, 1508, 1510 and 1512. As illustrated, the vectors are spaced apart by about 60 degrees.

In FIG. 14, the output stage power converter 1406 includes a first output converter 1430, a second output converter 1432, a third output converter 1434 and an output filter 1436. The output converters 1430, 1432 and 1434 are coupled with the respective interleaved full bridge converters 1410, 1412 and 1414 to provide DC to DC conversion and galvanic isolation as in previously discussed output converters. Each of the example output converters 1430, 1432 and 1434 illustrated in FIG. 14 includes a switch mode converter 1438 that is a full bridge non-resonant switch mode converter (chopper). In other examples, the output converters 1430, 1432 and 1434 may each include series resonant or any other switch mode converter configuration with similar functionality. The output converters 1430, 1432 and 1434 each also include a transformer 1440 and a bridge rectifier 1442.

Similar to FIG. 12, the output converters 1430, 1432 and 1434 may be controlled with a output stage switch mode controller (not shown) to operate with fixed frequency and interleave. Series interleaved operation may be with phase angles that are separated by about 120 degrees resulting in an output ripple frequency of six times the switching frequency of the output converters 1430, 1432 and 1434. The output converters 1430, 1432 and 1434 may also provide self-stabilization of the interleaved full bridge converters 1410, 1412 and 1414. The charging voltage on each of the boost capacitors (C1, C2, C3) 1428 may remain substantially in equilibrium and about the same discharging current may flow through each of the respective output converters 1430, 1432 and 1434 as previously discussed.

Figure 16:
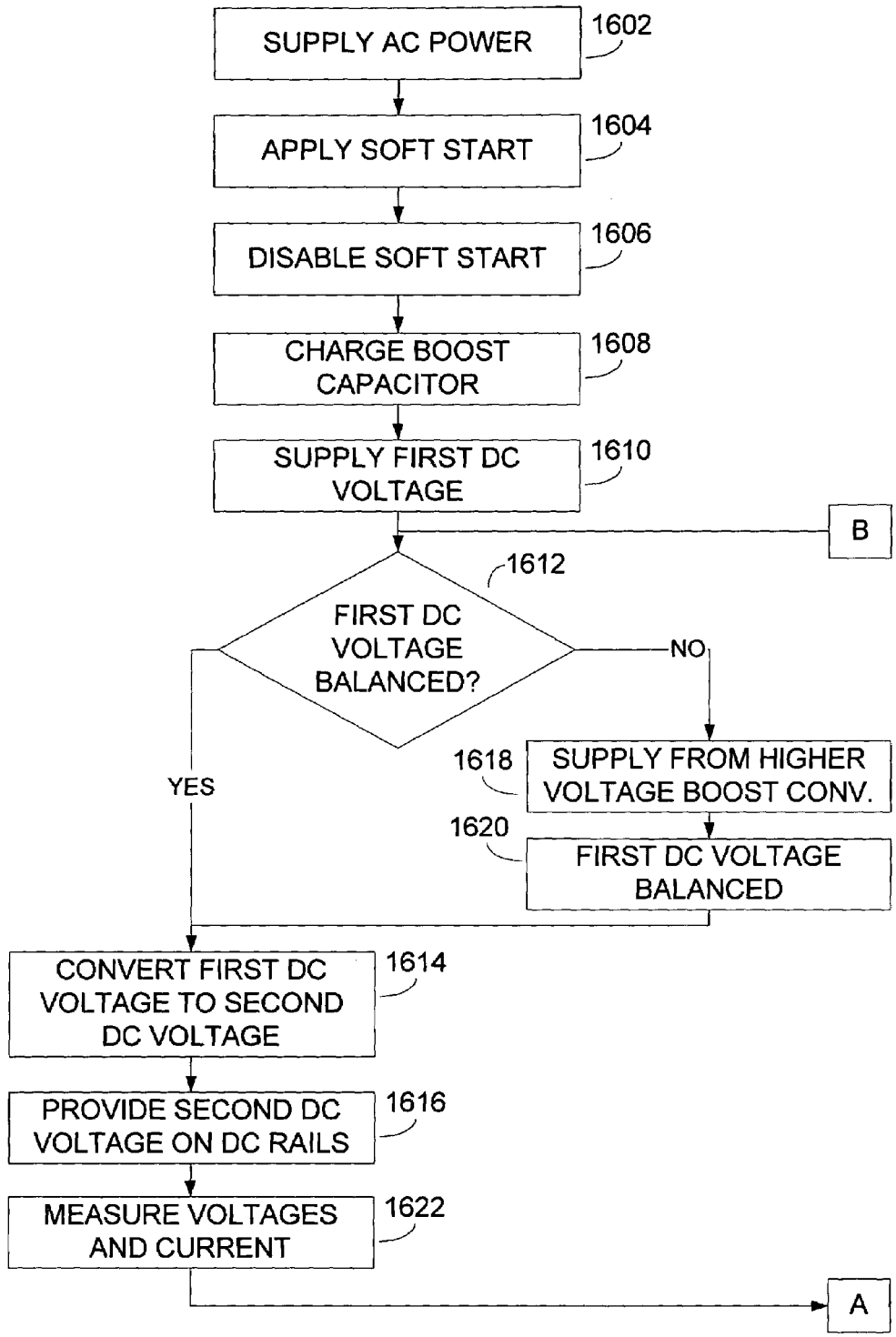
FIG. 16 is a process flow diagram illustrating operation of the power factor correcting power supply illustrated in FIGS. 1–15.

FIG. 16 is a process flow diagram illustrating example operation of the power factor correcting power supply 100 discussed with reference to FIGS. 1–8. The input stage power converter 202 includes two boost converters 230 and 232 coupled in series, each having two boost switches (S1, S2, S3, S4) 306, 308, 326 and 328 coupled in series with each other. The four series coupled boost switches (S1, S2, S3, S4) 306, 308, 326 and 328 are also coupled in parallel with the input voltage (Vin). In other examples, any number of series coupled boost converters may be included in the input stage power converter 202. The operation begins at block 1600 when AC power in the form of AC input voltage (Vin) and AC input current (Iin) is supplied to the power factor correcting power supply 100 from a power source 112. The softstart circuit 222 is activated at block 1602 to enable soft start by switching in the resistor 224 to limit inrush current. The AC input voltage (Vin) is rectified by the bridge rectifier at block 1604. At block 1606, the boost capacitors (C1, C2, C3, C4) 314, 316, 334 and 336 of the input stage power converter 202 and the capacitors (C5, C6) 826 and 828 of the output stage power converter 204 have been initially charged and the softstart circuit 222 disables soft start by switching out the resistor 228 with the first startup switch 224.

The PFC controller 234 controls switching of the boost switches (S1, S2, S3, S4) 306, 308, 326 and 328 to convert the rectified AC input voltage (Vin) to a first DC voltage at block 1608. The rectified AC voltage is converted by charging each of the boost capacitors (C1, C2, C3, C4) 314, 316, 334 and 336 to the charging voltage. The total charging voltage on all of the series connected boost capacitors (C1, C2, C3, C4) 314, 316, 334 and 336 equals the boost voltage (Vboost) that is the first DC voltage. The boost capacitors (C1, C2, C3, C4) 314, 316, 334 and 336 are charged with the PWM voltage (Vc) and the peak charging current (Ic) provided by demagnetization of the boost inductor 340. At block 1610, the first DC voltage is supplied to the output stage power converter 204.

It is determined if the first DC voltage is being supplied about equally from each of the boost converters 230 and 232 at block 1612. If supply of the voltage is substantially balanced, the output stage power converter 204 converts the first DC voltage to a second DC voltage at block 1614. At block 1616, the second DC voltage is provided on the positive and negative DC rails 106 and 108 as the DC output voltage (+Vcc, −Vcc) of the power factor correcting power supply 100. If at block 1612 the first DC voltage is not being supply about equally by the first and second boost converters 230 and 232, voltage and current is supplied from the boost converter with the higher voltage at block 1618. At block 1620, the voltages on the boost capacitors (C1, C2, C3, C4) 314, 316, 334 and 336 become substantially balanced and the operation proceeds to block 1614.

The PFC controller 234 senses the measured voltages and currents at block 1622. As previously discussed, the measured voltages and currents include the input voltage (Vin) from the power source 112, the input current (Iin) from the power source 112 and the DC output voltage on the positive and negative DC rails 106 and 108. In addition, the boost voltage (Vboost) (first DC voltage) provided as an output from the input stage power converter 202 may be sensed.

Figure 17:
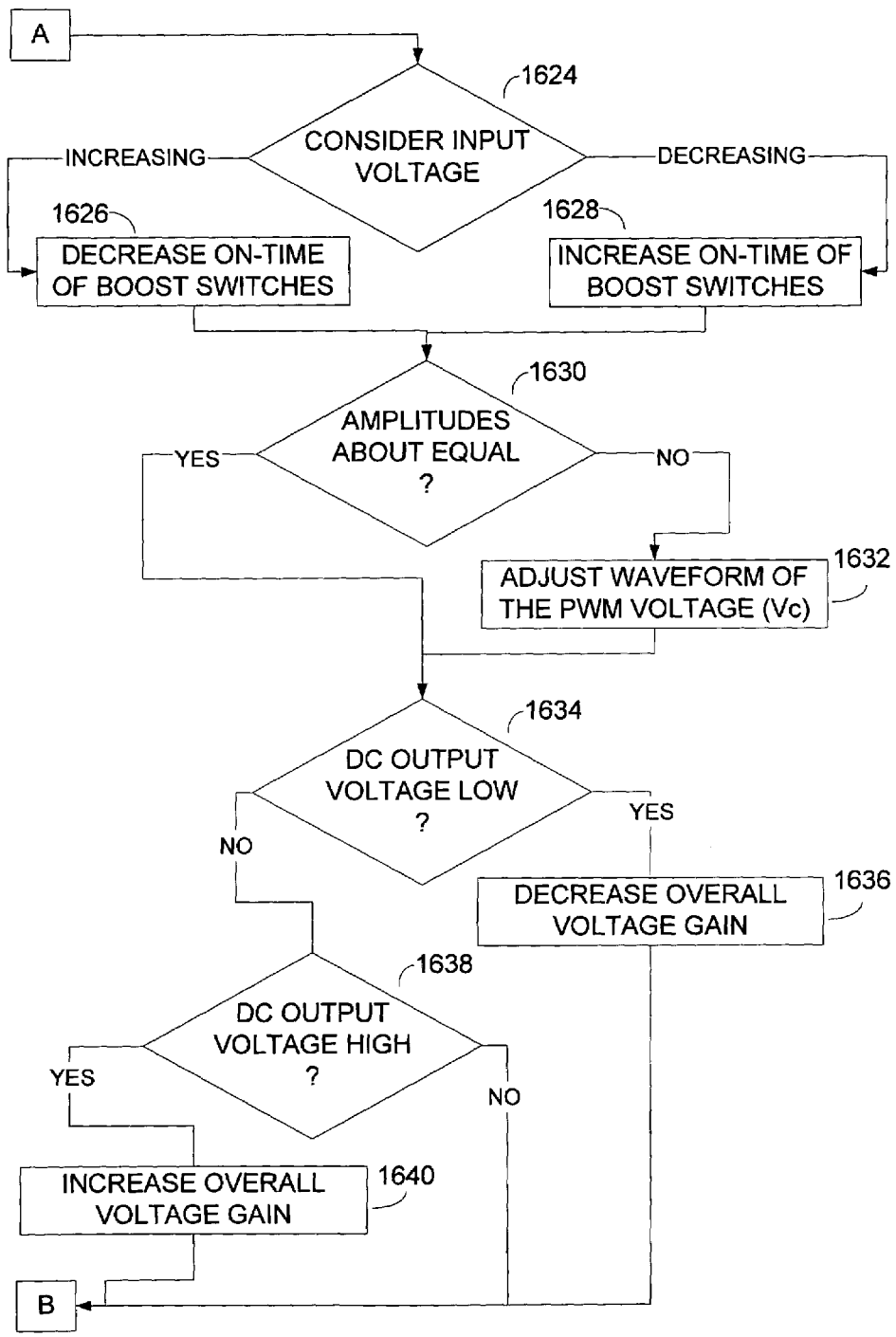
FIG. 17 is a second part of the process flow diagram of FIG. 16.

In FIG. 17 at block 1624, the PFC controller 234 considers the input voltage (Vin) from the power source 112 for purposes of accommodating the range of possible input voltages (Vin) provided from the power source 112. If the input voltage (Vin) is for example, about 40% of the boost voltage (Vboost) and rising in magnitude, the PFC controller 234 operates with interleave to decrease the on-time portion of the duty cycle of each of the series coupled boost switches (S1, S2, S3, S4) 306, 308, 326 and 328 at block 1626. If at block 1624, the input voltage (Vin) is for example, about 40% of the boost voltage (Vboost) and decreasing in magnitude, the PFC controller 234 increases the on-time portion of the duty cycle of at least four series coupled boost switch(s) (S1, S2, S3, S4) 306, 308, 326 and 328 at block 1628.

At block 1630, the PFC controller 234 considers whether the average amplitude of the PWM voltage (Vc) waveform produced by the series coupled boost switches (S1, S2, S3, S4) 306, 308, 326 and 328 is greater or less than the amplitude of the input voltage (Vin) waveform. If yes, the PFC controller 234 adjusts the waveform of the PWM voltage (Vc) with the PWM modulator 516 or 616 to bring the voltages substantially into equilibrium at block 1632. At block 1634, the PFC controller 234 determines if the magnitude of second DC voltage (DC output voltage (+Vcc, −Vcc)) of the power factor correcting power supply 100 is low. As previously discussed, the first DC voltage (boost voltage (Vboost)) may also be measured to determine low the second DC voltage. If the second DC voltage is low, the overall voltage gain is increased at block 1636. The overall voltage gain of the PFC controller 234 is increased to increase the amplitude of the PWM voltage (Vc) and thereby maintain the second DC voltage on the DC rails 106 and 108. The operation then returns to block 1612 of FIG. 16 to continue balancing the first DC voltage, controlling the power factor and regulating the first and second DC voltages.

Returning to block 1630, if the average waveform of the PWM voltage (Vc) is substantially the same as the sinusoidal waveform of the input voltage (Vin) the operation proceeds to block 1634. If at block 1634, the second DC voltage is not low, the PFC controller 234 determines if the second DC voltage (and the first DC voltage) is high at block 1638. If yes, the overall voltage gain is decreased to lower the magnitude of the first DC voltage (boost voltage (Vboost)) and the second DC voltage at block 1640. The operation then returns to block 1612 of FIG. 16. If the second DC voltage (and/or the first DC voltage) is not high at block 1638 of FIG. 17, the operation similarly returns to block 1612 of FIG. 16 to continue controlling.

The previously discussed examples of the power factor correcting power supply utilize an AC power source to supply a DC load. The power factor correcting power supply comprises boost converter(s) that include boost sub-circuits each having a boost switch. The boost switches are coupled in series with each other and in parallel with the input voltage (Vin). The boost switches may be switched using a high frequency conversion cycle to perform DC voltage regulation and power factor correction. Through the use of series interleave, the boost switches may be switched with identical switching frequency and sequentially phased switching duty to reduce ripple current and further improve power factor. With the series configuration of the boost switches, the input voltage (Vin) may be divided among the boost switches. The boost switches may therefore be subject to lower voltage and may be rated lower and switched at higher frequency.

The boost switches may be switched with relatively high frequency to supply a boost voltage (Vboost) that is a first DC voltage. The boost voltage (Vboost) may be stored on at least one capacitor in the input stage power converter. An output stage power converter that may be included in the power factor correcting power supply may provide conversion of the boost voltage (Vboost) to a DC output voltage. The output stage power converter may also provide isolation of the DC output voltage from the boost voltage (Vboost). In addition, the output stage power converter may provide balancing of the input stage power converter. When the boost voltage (Vboost) is supplied from a charging voltage stored on a plurality of boost capacitors, the output stage power converter may balance the charging of the boost capacitors to maintain the charging voltage on each boost capacitor about equal.

The boost switches are controlled with a PFC controller to provide the boost voltage (Vboost). The PFC controller controls the duty cycle of the boost switches to perform both voltage regulation and power factor correction. Power factor correction is based on maintaining the average amplitude of the waveform of a PWM voltage produced by the boost switches substantially similar to the amplitude of the waveform of the AC input voltage (Vin).

Feedforward voltage regulation control may also be performed by the PFC controller based on the measured input voltage (Vin). Feedback control based on the DC output voltage (positive DC output voltage (+Vcc) and negative DC output voltage (-Vcc)) of the power factor correcting power supply may also be used for voltage regulation. The feedback control may also utilize the measured current flow through the input stage power converter to further improve voltage regulation. An additional feedforward control may also be included in the PFC controller. The additional feedforward control may utilize the measured boost voltage (Vboost) for voltage regulation.

While various embodiments of the invention have been described, it will be apparent to those of ordinary skill in the art that many more embodiments and implementations are possible that are within the scope of the invention. Accordingly, the invention is not to be restricted except in light of the attached claims and their equivalents.

What is claimed is:

1. A power factor correcting power supply comprising:
   a first boost converter that includes a first boost sub-circuit coupled with a second boost sub-circuit;
   a second boost converter coupled in series with the first boost converter, where the second boost converter includes a third boost sub-circuit coupled with a fourth boost sub-circuit, and the first and second boost converters are configured to receive an input voltage and supply a boost voltage that is greater in magnitude than a peak magnitude of the input voltage, where the boost voltage is divided by a factor of at least four with the first, second, third, fourth sub-circuits; and
   a power factor correction controller coupled with the first and second boost converters, where the power factor correction controller is configured to control the first and second boost converters with pulse width modulation and series interleave operation with the factor of at least four as a function of the boost voltage.

2. The power factor correcting power supply of claim 1, where the first and second boost sub-circuits are coupled in series and the third and fourth boost sub-circuits are coupled in series.

3. The power factor correcting power supply of claim 1, where the each of the first, second, third and fourth boost sub-circuits include a boost switch, the boost switch of each of the first, second, third and fourth boost sub-circuits coupled in series and configured to be coupled in parallel with an input voltage.

4. The power factor correcting power supply of claim 1, where each of the first, second, third and fourth boost sub-circuits include a respective boost switch and a respective boost capacitor, the respective boost capacitor being chargeable by the respective boost switch to a portion of the boost voltage.

5. The power factor correcting power supply of claim 1, where the first boost converter includes a first boost capacitor and the second boost converter includes a second boost capacitor, the first and second boost sub-circuits configured to charge the first boost capacitor to a portion of the boost voltage and the third and fourth boost sub-circuits configured to charge the second boost capacitor to a portion of the boost voltage.

6. The power factor correcting power supply of claim 1, where each of the first, second, third and fourth boost sub-circuits include respective boost switches, each of the boost switches are independently switchable by the power factor correction controller with a double edge natural pulse width modulated triangle wave that is scaleable by the power factor correction controller based on the boost voltage.

7. The power factor correcting power supply of claim 1, further comprising an output stage power converter coupled with the first boost converter and the second boost converter.

8. The power factor correcting power supply of claim 1, where the boost voltage is a DC voltage.

9. The power factor correcting power supply of claim 1, where first boost converter is configured to supply a first boost voltage and the second boost converter is configured to supply a second boost voltage and the supplied boost voltage includes a summation of the first boost voltage and the second boost voltage.

10. The power factor correcting power supply of claim 1, where each of the first boost voltage and the second boost voltage is greater in magnitude than a peak magnitude of the input voltage.

11. The power factor correcting power supply of claim 1, where the respective first boost sub-circuit, the second boost sub-circuit, the third boost sub-circuit and the fourth boost sub-circuit are configured to receive the input voltage and supply the respective first boost sub-circuit output voltage, the second boost sub-circuit output voltage, the third boost sub-circuit output voltage and the fourth boost sub-circuit output voltage, and the supplied boost voltage is a summation of the first boost sub-circuit output voltage, the second boost sub-circuit output voltage, the third boost sub-circuit output voltage and the fourth boost sub-circuit output voltage.

12. The power factor correcting power supply of claim 11, where each of the first boost sub-circuit output voltage, the second boost sub-circuit output voltage, the third boost sub-circuit output voltage and the fourth boost sub-circuit output voltage is greater in magnitude than the peak magnitude of the input voltage.

13. The power factor correcting power supply of claim 12, where each of the first boost sub-circuit output voltage, the second boost sub-circuit output voltage, the third boost sub-circuit output voltage and the fourth boost sub-circuit output voltage is a DC voltage.

14. The power factor correcting power supply of claim 1, further comprising an output stage power converter coupled with the first boost converter and the second boost converter, where the output stage power converter includes a first output converter, a second output converter, and a switch mode converter, the switch mode converter configured with a predetermined switching duty cycle to substantially balance an output voltage of the first boost converter and the second boost converter.

15. A power factor correcting power supply comprising:
   an input stage power converter that includes at least four boost switches coupled in series, the at least four boost switches configured to be coupled in parallel with an input voltage; and
   a power factor correction controller coupled with the at least four boost switches, the power factor correction controller configured to direct the at least four boost switches independently with series interleave operation of a factor of at least four to provide a DC boost voltage from the input voltage, where the power factor correction controller is configured with feedforward control to direct the at least four boost switches as a function of the DC boost voltage.

16. The power factor correcting power supply of claim 15, where the input voltage and the DC boost voltage is divided about equally between each of the at least four boost switches.

17. The power factor correcting power supply of claim 15, further comprising an output stage power converter coupled with the input stage power converter, where the output stage power converter includes a first output converter and a second output converter.

18. The power factor correcting power supply of claim 17, where the first output converter is coupled in parallel with a first pair of the at least four boost switches and the second output converter is coupled in parallel with a second pair of the at least four boost switches.

19. The power factor correcting power supply of claim 18, where the first output stage power converter and the second output stage power converter each comprises a switch mode converter with a predetermined switching duty cycle that substantially balances an output voltage of the first and second pairs of the at least four boost switches.

20. The power factor correcting power supply of claim 17, where each of the first and second output converters includes a switch mode converter, a transformer and a bridge rectifier to convert the DC boost voltage to a DC output voltage that is isolated from the DC boost voltage.

21. The power factor correcting power supply of claim 17, where each of the first and second output converters comprises a fixed frequency non-regulating half-bridge chopper.

22. The power factor correcting power supply of claim 15, where the input stage power converter includes at least four respective boost sub-switches configured to operate in time alternation with the respective at least four boost switches.

23. The power factor correcting power supply of claim 15, where the input voltage is an AC input voltage and two of the at least four boost switches are configured as a first full bridge converter and two of the at least four boost switches are configured as a second full bridge converter.

24. The power factor correcting power supply of claim 15, further comprising a bridge rectifier coupled with the input stage power converter, where the bridge rectifier is configured to provide a rectified AC input voltage as the input voltage to the input stage power converter.

25. The power factor correcting power supply of claim 15, further comprising a synchronous rectifier coupled with the input stage power converter, where the synchronous rectifier is configured to supply a rectified AC input voltage as the input voltage to the input stage power converter and receive an output voltage from the input stage power converter.

26. The power factor correcting power supply of claim 15, further comprising an output stage power converter coupled with the input stage power converter, where the output stage power converter includes a first output converter, a second output converter, and a switch mode converter, the switch mode converter configured with a predetermined switching duty cycle to substantially balance an output voltage of the first and second pairs of the at least four boost switches.

27. A power factor correcting power supply comprising:
an input stage power converter that includes a power factor correction controller and a first boost converter coupled in series with a second boost converter, where the first and second boost converters are controlled with interleave by the power factor correction controller to supply a DC boost voltage and to control a wave shape of an AC input current supplyable to the power factor correcting power supply by a power source; and
an output stage power converter coupled with the first and second boost converters, where the output stage power converter is configured to balance the boost voltage supplied with the first and second boost converters.

28. The power factor correcting power supply of claim 27, where the output stage power converter includes a first output converter and a second output converter, the first output converter coupled with the first boost converter, and the second output converter coupled with the second boost converter.

29. The power factor correcting power supply of claim 28, where the first and second output converters are configured to balance a voltage contribution to the DC boost voltage from each of the first and second boost converters.

30. The power factor correcting power supply of claim 27, where the first and second boost converters each include a plurality of boost sub-circuits coupled in series, where each of the boost sub-circuits include a boost switch.

31. The power factor correcting power supply of claim 27, where the first and second boost converters are controlled by the power factor correction controller with frequency modulation to reduce electromagnetic interference.

32. The power factor correcting power supply of claim 27, where the output stage power converter includes a fixed frequency switch mode power converter and a transformer, the fixed frequency switch mode power converter configured to provide a DC output voltage to a DC rail, and the transformer having galvanic isolation to minimize switching noise of the first and second boost converters.

33. The power factor correcting power supply of claim 27, where the output stage power converter includes an output converter and an output filter configured to convert the DC boost voltage to a DC output voltage supplyable to a load.

34. The power factor correcting power supply of claim 33, where the power factor controller is configured to regulate the DC output voltage as a function of the DC boost voltage and the DC output voltage.

35. The power factor correcting power supply of claim 33, where the power factor correction controller is configured to regulate the DC output voltage as a function of the DC boost voltage, the DC output voltage and the AC input current.

36. The power factor correcting power supply of claim 27, where the output stage power converter includes a switch mode converter configured with a predetermined switching duty cycle to substantially balance the boost voltage supplied with the first and second boost converters.

37. A power factor correcting power supply comprising:
an input stage power converter that includes a first pair of boost switches coupled in series and a second pair of boost switches coupled in series, where the first and the second pair of boost switches are coupled in series;
means for controlling power factor coupled with the first and the second pair of boost switches, the means for controlling power factor configured to control each of the first and the second pair of boost switches with interleave to provide a portion of a DC boost voltage; and
an output stage power converter coupled with the input stage power converter, where the output stage power converter includes a first output converter coupled with the first pair of boost switches and a second output converter coupled with the second pair of boost switches, where the output stage power converter is configured to substantially balance the portion of the DC boost voltage provided by each of the first and the second pair of boost switches.

38. The power factor correcting power supply of claim 37, where the input stage power converter includes an inductor and a plurality of boost capacitors that are coupled with the first and the second pair of boost switches, the first and the second pair of boost switches switchable to magnetize the inductor and charge the boost capacitors.

39. The power factor correcting power supply of claim 38, where the first pair of boost switches are cooperatively switchable to charge a first boost capacitor and the second pair of boost switches are cooperatively switchable to charge a second boost capacitor.

40. The power factor correcting power supply of claim 38, where a first and a second boost switch included in the first pair of boost switches are each switchable to charge a respective first and a second boost capacitor and a third and a fourth boost switch included in the second pair of boost switches are each switchable to charge a respective third and a fourth boost capacitor.

41. The power factor correcting power supply of claim 37, where the input stage power converter includes a first and a second pair of boost sub-switches coupled with the respective first and the second pair of boost switches, the input stage power converter configured to supply power to a power source and consume power from the power source as a function of control by the power factor correction controller.

42. The power factor correcting power supply of claim 37, where the input stage power converter includes a first and a second pair of diodes coupled with the respective first and the second pair of boost switches, the input stage power converter configured to consume power from a power source as a function of control by the power factor correction controller.

43. The power factor correcting power supply of claim 37, where the first output converter and the second output converter each comprises a switch mode converter with a predetermined switching duty cycle that substantially balances the portion of the DC boost voltage provided by each of the first and the second pair of boost switches.

44. A power factor correcting power supply comprising:
a first boost switch and a second boost switch, the first and second boost switches coupled in series and configured to be coupled in parallel with an AC power source;
a first boost sub-switch coupled in series with the first boost switch;
a second boost sub-switch coupled in series with the second boost switch;
a boost capacitor coupled across at least one of the first boost switch coupled in series with the first boost sub-switch and the second boost switch coupled in series with the second boost sub-switch; and
a power factor correction controller coupled with the first and second boost switches and the first and second boost sub-switches, where the first and second boost switches and the first and second boost sub-switches are switchable with pulse width modulation to develop at least a portion of a DC boost voltage on the boost capacitor from an unrectified AC input voltage supplyable from the AC power source, wherein the DC boost voltage is greater in magnitude than a peak magnitude of the AC input voltage.

45. The power factor correcting power supply of claim 44, where the boost capacitor is coupled across both the first boost switch and the first boost sub-switch and the boost capacitor is also coupled across the second boost switch and the second boost sub-switch.

46. The power factor correcting power supply of claim 44, where the boost capacitor comprises a first boost capacitor and a second boost capacitor, the first boost capacitor is coupled across the first boost switch and the first boost sub-switch and the second boost capacitor is coupled across the second boost switch and the second boost sub-switch.

47. The power factor correcting power supply of claim 44, where at least a portion of an output stage power converter is coupled in parallel with the boost capacitor.

48. The power factor correcting power supply of claim 44, further comprising an output stage power converter coupled in parallel with the boost capacitor, where the output stage converter includes a switch mode converter, a transformer and an output filter to convert the DC boost voltage to a DC output voltage that is isolated from the DC boost voltage.

49. The power factor correcting power supply of claim 44, further comprising an output stage power converter that includes a non-resonant fixed frequency switch mode converter and an isolation transformer to galvanically isolate the DC boost voltage.

50. The power factor correcting power supply of claim 44, where the power factor correcting power supply is operable with bilateral energy flow to consume power from the AC power source, and to supply power to the AC power source.

51. A method of performing power factor correction with a power factor correcting power supply, the method comprising:
providing a power source having an input voltage and an input current;
interleave switching at least four boost switches that are coupled in series across the power source to convert the input voltage to a first DC voltage;
converting the first DC voltage to a second DC voltage with an output stage power converter;
switching a switch mode converter included in the output stage power converter with a predetermined duty cycle to substantially balance conversion of the input voltage to the first DC voltage among the at least four boost switches; and
supplying the second DC voltage to a power rail to supply a load.

52. The method of claim 51, where interleave switching comprises regulating the second DC voltage to a desired magnitude as a function of the first DC voltage and the second DC voltage.

53. The method of claim 51, where interleave switching comprises substantially matching a waveform of a pulse width modulation voltage supplied to a boost capacitor by at least one of the at least four boost switches to a waveform of the input voltage.

54. The method of claim 53, where converting the first DC voltage to a second DC voltage comprises substantially balancing division of the first DC voltage between the at least four boost switches.

55. The method of claim 51, where interleave switching comprises dividing the input voltage and the first DC voltage between the at least four boost switches.

56. The method of claim 51, where interleave switching comprises creating a pulse width modulation voltage to charge a boost capacitor to at least a portion of the first DC voltage.

57. The method of claim 51, where converting the first DC voltage to a second DC voltage comprises galvanically isolating the first DC voltage from the second DC voltage.

58. The method of claim 51, where the input voltage is un-rectified AC input voltage, and the input current is un-rectified AC input current.

59. The method of claim 51, where the input voltage is rectified AC input voltage, and the input current is rectified AC input current.

60. The method of claim 51, where interleave switching at least four boost switches comprises series interleave switching with a factor of at least four.

* * * * *